US012749203B2

(12) United States Patent
Morris et al.

(10) Patent No.: US 12,749,203 B2
(45) Date of Patent: Sep. 29, 2026

(54) SYSTEMS AND METHODS FOR ANNOTATING IMAGE SEQUENCES WITH LANDMARKS

(71) Applicant: BOARD OF TRUSTEES OF MICHIGAN STATE UNIVERSITY, East Lansing, MI (US)

(72) Inventors: Daniel Morris, Okemos, MI (US); Steven Yik, East Lansing, MI (US); Madonna Benjamin, East Lansing, MI (US); Michael Lavagnino, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 596 days.

(21) Appl. No.: 17/926,904

(22) PCT Filed: May 21, 2021

(86) PCT No.: PCT/US2021/033753
§ 371 (c)(1),
(2) Date: Nov. 21, 2022

(87) PCT Pub. No.: WO2021/237153
PCT Pub. Date: Nov. 25, 2021

(65) Prior Publication Data

US 2023/0206469 A1 Jun. 29, 2023

Related U.S. Application Data

(60) Provisional application No. 63/028,508, filed on May 21, 2020.

(51) Int. Cl.
*G06T 7/246* (2017.01)
*G06T 7/73* (2017.01)

(52) U.S. Cl.
CPC ................ *G06T 7/248* (2017.01); *G06T 7/74* (2017.01); *G06T 2207/10016* (2013.01);
(Continued)

(58) Field of Classification Search
CPC . G06T 7/248; G06T 7/74; G06T 2207/10016; G06T 2207/10028;
(Continued)

(56) References Cited

U.S. PATENT DOCUMENTS

| | | | |
|---|---|---|---|
| 2005/0257748 A1 | 11/2005 | Kriesel et al. | |
| 2013/0178718 A1 | 7/2013 | Tran et al. | |

(Continued)

FOREIGN PATENT DOCUMENTS

| | | |
|---|---|---|
| CN | 109508907 A | 3/2019 |
| CN | 109784200 A | 5/2019 |

(Continued)

OTHER PUBLICATIONS

Chen, C. et al., VTag: A Semi-Supervised Pipeline for Tracking Pig Activity with a Single Top-View Camera, Journal of Animal Science, 2022, 100:1-10.

(Continued)

*Primary Examiner* — Oneal R Mistry
*Assistant Examiner* — Justin Philip Cascais
(74) *Attorney, Agent, or Firm* — QUARLES & BRADY LLP

(57) ABSTRACT

This disclosure describes various attributes and implementations of systems and methods for efficiently generating high accuracy landmark annotations for depth-based image or video data sets. For example, a Transpositional Tagging approach can automatically or semi-automatically find, identify, and track landmarks (such as human or animal joints, other structural landmarks, or other points of interest) that are visible in one imaging modality (such as infrared,
(Continued)

optical, etc.), and transfer those labels to a second image modality (such as, e.g., near-IR depth images/videos). As a result, systems and methods provided herein can quickly generate highly specific training datasets that are then used to develop neural network models for detecting poses, positions, and/or movements in imaging modalities such as 3D and depth images.

18 Claims, 28 Drawing Sheets

(52) U.S. Cl.
CPC ............... *G06T 2207/10028* (2013.01); *G06T 2207/10048* (2013.01); *G06T 2207/10152* (2013.01); *G06T 2207/20081* (2013.01); *G06T 2207/20084* (2013.01)

(58) Field of Classification Search
CPC . G06T 2207/10048; G06T 2207/10152; G06T 2207/20081; G06T 2207/20084; G06V 10/46; G06V 10/774; G06V 10/82; G06V 40/10; G06V 40/20
See application file for complete search history.

(56) References Cited

U.S. PATENT DOCUMENTS

| | | | | |
|---|---|---|---|---|
| 2014/0267776 | A1* | 9/2014 | Duthu ..................... | G01S 17/89 348/169 |
| 2014/0293277 | A1* | 10/2014 | Subbiah .................... | G01J 3/28 356/300 |
| 2015/0302241 | A1* | 10/2015 | Eineren .................. | G06V 40/10 382/110 |
| 2017/0287056 | A1* | 10/2017 | Dohlman ............ | G06F 16/5838 |
| 2017/0344114 | A1* | 11/2017 | Osterhout ............... | G06F 1/163 |
| 2018/0239948 | A1* | 8/2018 | Rutschman ............... | G06T 7/20 |
| 2018/0247134 | A1* | 8/2018 | Bulzacki ............. | G07F 17/3211 |
| 2020/0019921 | A1 | 1/2020 | Buibas et al. | |
| 2023/0337636 | A1 | 10/2023 | Schmigelsky et al. | |

FOREIGN PATENT DOCUMENTS

| | | |
|---|---|---|
| WO | 2016/200564 A1 | 12/2016 |
| WO | 2020/003310 A1 | 1/2020 |

OTHER PUBLICATIONS

Chen, M. et al., Convolutional Neural Networks for Automated Annotation of Cellular Cryo-Electron Tomograms, Nature Methods, 2017, 14(10):983-985.
Gronskyte, R. et al., Pig Herd Monitoring and Undesirable Tripping and Stepping Prevention, Computers and Electronics in Agriculture, 2015, 119:51-60.
Gronskyte, R. et al., Monitoring Pig Movement at the Slaughterhouse Using Optical Flow and Modified Angular Histograms, Biosystems Engineering, 2016, 141:19-30.
Guo, Y. et al., Foreground Detection of Group-Housed Pigs Based on the Combination of Mixture of Gaussians Using Prediction Mechanism and Threshold Segmentation, Biosystems Engineering, 2014, 125:98-104.
Guo, Y. et al., Multi-Object Extraction from Topview Group-Housed Pig Images Based on Adaptive Partitioning and Multilevel Thresholding Segmentation, Biosystems Engineering, 2015, 135:54-60.
Jiang, B. et al., FLYOLOv3 Deep Learning for Key Parts of Dairy Cow Body Detection, Computers and Electronics in Agriculture, 2019, 166:104982, pp. 1-8.
Ju, M. et al., A Kinect-Based Segmentation of Touching-Pigs for Real-Time Monitoring, Sensors, 2018, 18:1746, pp. 1-24.
Kashiha, M. et al., The Automatic Monitoring of Pigs Water Use by Cameras, Computers and Electronics in Agriculture, 2013, 90:164-169.
Kulikov, V. et al., Application of 3-D Imaging Sensor for Tracking Minipigs in the Open Field Test, Journal of Neuroscience Methods, 2014, 235:219-225.
Mahfuz, S. et al., Applications of Smart Technology as a Sustainable Strategy in Modern Swine Farming, Sustainability, 2022, 14:2607, pp. 1-15.
Mathis, A., et al., DeepLabCut: Markerless Pose Estimation of User-Defined Body Parts with Deep Learning, Nature Neuroscience, 2018, 21:1281-1289.
Milletari, F. et al., V-Net: Fully Convolutional Neural Networks for Volumetric Medical Image Segmentation, 2016 Fourth International Conference on 3D vision (3DV), IEEE, 2016, pp. 565-571.
Mittek, M. et al., Health Monitoring of Group-Housed Pigs Using Depth-Enabled Multi-Object Tracking, Proceedings of the International Conference on Pattern Recognition, Workshop on Visual Observation and Analysis of Vertebrate and Insect Behavior, 2016, 4 pages.
Moradi, M. et al., A Cross-Modality Neural Network Transform for Semi-Automatic Medical Image Annotation, Medical Image Computing and Computer-Assisted Intervention, MICCAI, 2016, Part II, LNCS 9901, pp. 300-307.
Nasirahmadi, A. et al., Using Machine Vision for Investigation of Changes in Pig Group Lying Patterns, Computers and Electronics in Agriculture, 2015, 119:184-190.
Newell, A. et al., Stacked Hourglass Networks for Human Pose Estimation, arXiv:1603.06937, 2016, pp. 1-17.
Pezzuolo, A. et al., On-barn Pig Weight Estimation Based on Body Measurements by a Kinect v1 Depth, Computers and Electronics in Agriculture, 2018, 148:29-36.
Psota, E. et al., Multi-Pig Part Detection and Association with a Fully-Convolutional Network, Sensors, 2019, 19:852, 24 pages.
Rajchl, M. et al., DeepCut: Object Segmentation from Bounding Box Annotations Using Convolutional Neural Networks, IEEE Transactions on Medical Imaging, 2017, 36(2):674-683.
Stavrakakis, S. et al., Validity of the Microsoft Kinect Sensor for Assessment of Normal Walking Patterns in Pigs, Computers and Electronics in Agriculture, 2015, 117:1-7.
Taha, A. et al., Kid-Net: Convolution Networks for Kidney Vessels Segmentation from CT-Volumes, Medical Image Computing and Computer Assisted Intervention, MICCAI, 2018, Part IV, pp. 463-471.
Wang, K. et al., A Portable and Automatic Xtion-based Measurement System for Pig Body Size, Computers and Electronics in Agriculture, 2018, 148:291-298.
Yik, S. et al., DIAT (Depth-Infrared Image Annotation Transfer) for Training a Depth-Based Pig-Pose Detector, 2020 IEEE/RSJ International Conference on Intelligent Robots and Systems (IROS), 2020, pp. 1080-1087.
PCT International Search Report and Written Opinion, PCT/US2021/033744, Sep. 14, 2021, 13 pages.
PCT International Search Report and Written Opinion, PCT/US2021/033753, Aug. 24, 2021, 10 pages.
European Search Report based on related Application No. 21807812.9, mailed Jun. 7, 2024. 10 Pages.
Ding, Li, et al. "A novel deep learning pipeline for retinal vessel detection in fluorescein angiography." IEEE Transactions on Image Processing 29 (2020): pp. 6561-6573.
Yik, Steven, et al. "DIAT (Depth-Infrared Image Annotation Transfer) for training a depth-based pig-pose detector." 2020 IEEE/RSJ International Conference on Intelligent Robots and Systems (IROS). IEEE, 2020. 8 Pages.
Yik, Steven. An Automated 3D Pose Estimation System for Sow Health Monitoring. Michigan State University, 2020. 97 Pages.
European Search Report based on Application No. 21809670.9, mailed Jun. 5, 2024. 14 Pages.

* cited by examiner

600

302

304

314

SYSTEMS AND METHODS FOR ANNOTATING IMAGE SEQUENCES WITH LANDMARKS

CROSS-REFERENCE TO RELATED APPLICATIONS

This application claims priority to and the benefit of provisional patent application No. 63/028,508 filed in the United States Patent and Trademark Office (USPTO) on May 21, 2020, the entire content of which is incorporated herein by reference as if fully set forth below in its entirety and for all applicable purposes.

BACKGROUND

Advances in tracking human or animal pose and posture have been achieved through sensing modalities such as the Kinect paired with machine learning, as well as the use of convolutional neural networks (CNNs). Many of these advances in tracking human or animal posture depend on large, pre-labeled datasets for training. However, for certain categories of activity, or certain types of subjects (e.g., animals with difficult-to-assess morphology, unusual or rare animals, or uncommon human activities), large datasets are not always available. This causes two needs: first, the need to develop a way to efficiently create training datasets of pose/posture from images; and second, the need to determine pose in those images in a highly accurate way to maximize the ability for machine learning or other applications to draw predictive power from the datasets. Additionally, markers used for motion capture devices may not be useful as the markers will be visible in the imager, and therefore impact any neural network trained on them and potentially harming the network's performance on data without markers.

For example, some existing efforts for pose estimation of animals has relied on a number of features including body contour, ellipse fitting, motion and color cues, and flow-based detection. These methods give very coarse pose, and are unlikely to be as robust as modern CNN methods. Other techniques utilize CNNs to detect boundaries for pigs (e.g., in Kinect data), which again is a coarse pose estimate.

Other CNN-based techniques use manual labeling of landmarks on images of a subject (e.g., 4 hand-labeled landmarks on pigs) in order to train a CNN to detect pose. While such a technique could provide more detailed pose predictive power than other existing techniques, the usefulness and accuracy of such a system is limited given the large amount of manual work (and associated errors) necessary in labeling landmarks. The fewer landmarks used, the less human involvement is needed; however accuracy falls as landmarks are reduced. Similarly, certain types of images and video (e.g., depth cameras) are difficult for humans to perceive and, as a result, can introduce greater errors and more inefficiency during a manual tagging process (if such a process is even feasible).

It would therefore be desirable to have a system that could provide for a way to rapidly and efficiently annotate video datasets (depth, color or other modalities) with body feature locations (landmarks) in the images and to do so with minimal human involvement while maximizing the accuracy and number of landmarks.

SUMMARY OF THE INVENTION

In one aspect, a system in accordance with the present disclosure comprises at least one camera, at least one processor, and at least one memory in communication with the camera and processor. The memory has a set of instructions stored thereon which, when executed by the processor, cause the system to: obtain a first set of image data corresponding to an object of interest at a given timeframe, determine location identifiers at one or more locations in at least one image of the first set of image data corresponding to one or more landmarks of interest, automatically apply the location identifiers to locations of one or more landmarks of interest in additional images of the first set of image data, transpose the location identifiers applied to the images of the first set of image data to images of a second set of image data corresponding to the same object of interest during the same given timeframe, and store the second set of image data with transposed identifiers in the at least one memory.

In another aspect, the present disclosure provides a method for assessing movement of a subject. The method comprising acquiring video data of a subject during a given timeframe, tagging landmarks of interest of the subject in frames of the video data, using at least one landmark detector, wherein the landmark detector comprises a first neural network trained by generating a first annotated training dataset of a first imaging modality and transposing tags of the first training dataset to a second training dataset of a second imaging modality, providing the frames of the video data to a second neural network, wherein the second neural network was trained by associating condition determinations of a set of objects of interest with tagged video clips of movement of the objects of interest, and determining a condition of the movement of the subject using the second neural network.

DETAILED DESCRIPTION

Figure 1:
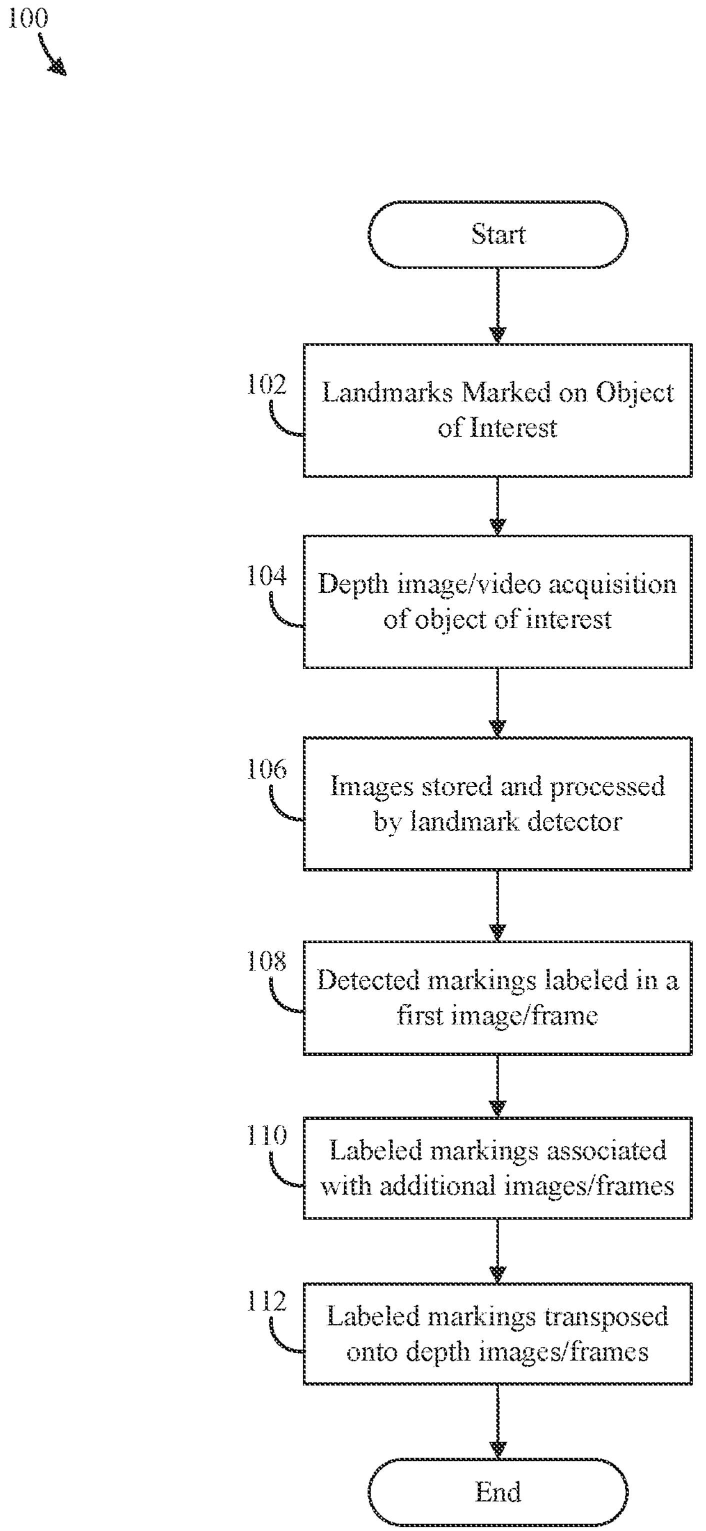
FIG. 1 is an example of a process for detecting marked areas on an object of interest.

A system and method are now described for overcoming the limitations and disadvantages of prior attempts. As described herein, various features and embodiments of the present invention can allow for efficient generation of high quality datasets that contain pose and posture labeling of humans, animals, or other moving or articulate objects. These data sets may be used for a variety of purposes, including generating motion flows for motion simulation (e.g., motion capture), training neural networks, detecting various conditions, problems, or pathologies of a subject, and predicting productivity or positive outcomes of a subject.

In developing the inventions described herein, the inventors have determined that the type and quality of initial images, video, and other data that may be input to the systems and methods described herein can impact the output. In certain embodiments (e.g., developing pose/posture datasets for capturing human or animal motion) it may be desirable to utilize depth images or video clips, such as 3D datasets from stereo or non-stereo depth cameras. For example, some depth cameras may operate using two lenses, or a single lens, and others may operate through recording time of flight of reflectance of an IR or light signal projected onto a subject, whereas others may operate through measuring size, distortion, and reflectance of a field of dots or other pattern projected onto a subject. In other embodiments, it may be useful to utilize IR images, optical images, or UV-illuminated optical images, or a combination of the foregoing such as: IR images/video in combination with 3D depth images/video; UV-illuminated images/video in combination with 3D depth images; optical images/video in combination with IR images/video; or other such combinations.

To explain certain aspects of the various embodiments of the present invention, one example implementation will first be discussed. Then, after certain concepts, algorithms, techniques, and features have been described with respect to the first implementation, additional implementations will be described to demonstrate how the benefits of the present invention can be leveraged for additional purposes in additional ways.

Precision livestock farming uses artificial intelligence to individually monitor livestock activity and health. Tracking individuals over time can reveal health indicators that correlate with productivity and longevity. For instance, locomotion patterns observed in lame pigs have been shown to correlate with poor animal welfare and productivity. Kinematic analysis of pigs using pose estimates provides a means of assessing locomotion. New dense depth sensors have potential to achieve full 3D pose estimation and tracking. However, the lack of annotated dense depth datasets has limited use of these sensors in detecting animal pose. Current annotation methods rely on human labeling, but identifying hip and shoulder locations is difficult for pigs with few prominent features, and is especially difficult in depth images as these lack albedo texture. This work proposes a solution to quickly generate high accuracy pig landmark annotations for depth-based pose estimation. We propose a Transfer Labeling approach that semi-automatically finds, identifies, and tracks marks visible in infrared, and transfers these labels to depth images. As a result, we are able to train a precise pig pose detector that operates on depth images.

Example 1: Precision Livestock Farming

In a first example, depth cameras were chosen to acquire video and image data for purposes of estimating livestock posture and gait. Depth cameras were chosen for this application since depth camera output can be configured (as described below) to provide precise 3D joint and body positions as animals move. However, with a lack of texture in depth imaging data, the inventors discovered that it was challenging for an individual to hand-label depth images, especially for animals (such as pigs) for which nuances in physiology are not readily recognized by most people. And, it is not practical for animals to wear motion capture suits or similar markers, nor would doing so provide data that can easily be extrapolated to other images to efficiently create a larger set of data. Additionally, motion capture suits would impact the data collected and so not generate data suitable for training posture estimation networks that observe only unmarked animals.

Therefore, one solution presented herein will be referred to as Transpositional Tagging. In one implementation of this technique, various types of markers are used with respect to a subject that are visible in infrared, UV-illuminated optical images, or other images which acquired at the same time as 3D depth data, whether from the same device or sets of associated devices. In the example of livestock detection, markers were used that were visible in infrared images associated with IR depth data acquisition. As described below, these markers can be semi-automatically detected and tracked, and then their positions transposed to the depth images/video frames output by the depth IR camera at this same moment in time. The resulting depth images, now tagged with various structural locations relevant for pose, posture, and/or movement estimation were determined to be useful for modeling 3D motion of animals and, in turn, for training neural networks to make various motion-related predictions and detections. In one experiment, this implementation of the Transpositional Tagging technique enabled rapid labeling of pig depth images with minimal human labor, and enabled training of a novel depth-based pig pose detector.

At a high level, a Transpositional Tagging technique can provide advantages including but not limited to:

- detecting features in one type of image (such as IR images) in which the feature is more apparent (whether because it is easier for a human tasked with tagging features in an image to see, because it is only evident in certain types of images, or otherwise), and then transferring the location of that feature to a type of image that has greater information relevant to full 3D motion, such as a 3D depth image.
- efficient, semi-automated labeling of target structural locations (e.g., joints, or key contour points) using a landmark detector combined with optical flow for association; and
- generation of a large, customized training dataset for pig pose estimation from depth images through trained machine learning algorithms.

It is desirable for data acquisition in precision livestock farming (PLF) applications to be robust within farm environments, not impede the motion of livestock, and not place undue burden on caregivers. At the same time, the measurement data should provide quantitative evaluation from which livestock condition and health can be inferred. The inventors determined that it would therefore be desirable to utilize depth cameras in some embodiments, as they would have potential to address these considerations. Depth cameras are non-contact and can be placed out of the way above livestock routes, while simultaneously providing dense 3D shape measurements of livestock to assess body size, shape, joint and muscle locations, and with temporal data, may potentially observe kinematic characteristics and abnormalities including lesions, lameness, coordination and body condition.

However, the inventors determined that what is missing from 3D/depth livestock data feeds is an ability to implement automated detection of animal structure (e.g., joint locations and other landmarks such as tail/end, rib locations, nose/snout, leg and thigh thickness, etc.) with precise estimation of their pose in each depth image. This information would be useful for farmers to better understand useful body and health metrics of the animals.

Despite depth cameras' ability to provide precise 3D shape and contour information, identifying particular joint locations on an animal body from 3D camera output is challenging for a human seeking to prepare raw depth camera output for use as a training data set for a neural network or similar application. Factors that contribute to this difficulty include: a lack of albedo texture in depth images; animal shape and size can vary significantly; and joint locations such as the hip and shoulders are often not prominent and difficult to identify through visual or palpation observation. Consequently, precise manual labeling of animal joint locations in depth images is impractical, and is difficult even in high resolution color and IR images. Alternative high-precision methods such as motion capture suits or physical tracking markers are not feasible as animals are inquisitive and may chew or ingest standard tracking markers.

In some embodiments, near-IR image capture may be leveraged that is available in many depth sensors including Intel's RealSense cameras (e.g. an Intel RealSense D435 camera), Azure Kinect DK camera, and/or any other suitable depth sensor. The RealSense camera may be used in embodiments in which signal noise can be mitigated by having an active camera that projects a near-IR pattern on the scene and uses a stereo IR pair to estimate depth both from the pattern and the underlying reflectance image. A consequence is that the selected IR image is pixel-wise aligned with the depth image. In other embodiments, a separate IR or optical image could be acquired in registration with a depth image. In other embodiments (or in other physical locations, such as certain facilities, studios, outdoors, etc.), signal to noise may be improved by using a time of flight camera such as the Kinect or similar depth cameras. By using two or more types of image or data capture (e.g. depth plus image), labeling of features of interest in a scene can be accomplished in one image modality and transposed to another modality (e.g., a depth image). Once feature locations and IDs are transferred to the depth image, they can be used to directly train a depth-only pig pose estimator.

In some embodiments, a system can use a single optical camera to observe a target that is synchronized with an ultraviolet (UV) illuminator. The UV illuminator can strobe the scene so that a first subset of the images/frames recorded are illuminated with UV. Marks that are only observable when illuminated by UV can be placed on the body parts of interest. The marks can be located in the illuminated images, and their location can be transposed into the non-illuminated second subset of the images (which are interleaved with the first subset). The second subset of images are interleaved with the first set in a cadence such that the images are acquired when the illuminator is off, such that the images have no UV illumination and thus appear as regular images. The images in the second subset can then be used for training a model such as a neural network. In some embodiments, locating the marks can include a form of interpolation because the target motion between adjacent frames will typically be small. Thus, these embodiments of transpositional tagging occur between temporally separated frames with and without UV illumination. In contrast, embodiments that utilize depth cameras, the transpositional tagging occur simultaneously between different modalities (IR to depth).

Identifying and labeling features of interest in a second imaging modality can be accomplished in several ways. For example, in some precision livestock applications it may be useful to mark or stain certain structural locations of an animal using a UV-sensitive material which would highlight in a UV image. For other animals, manual marking in an optical image may be feasible, for example when the bone structure of an animal such as dairy or beef cattle is prominent. In other applications, it may be useful to utilize markings evident in IR images. For example, in one experiment the inventors marked pig joint locations with livestock-marking wax crayons that have high contrast in infrared. These crayons are food safe, easy to apply and do not impact the depth images. The eight key skeletal features that were marked in pigs were first located through palpation, and consist of the pigs' head (HD), neck (NK), left (LS) and right (RS) shoulders, last rib (LR), left (LT) and right (RT) hips, and tail-head (TL). To retain consistency, one swine specialist marked all pigs. FIG. 2(*a*) shows the placement of each mark in the infrared image and the resulting depth image.

Referring now to FIG. 1, a process flow chart 100 is shown for an example method of generating a labeled training data set using a Transpositional Labeling technique. At step 102, joint locations and other landmarks of interest of one or more animals are marked with wax crayons, UV stain, or other similar techniques as may be described throughout this document. In some implementations, it may be desirable to include additional markings, or ensure the markings follow a consistent pattern so that an automated labeling system can subsequently determine the identities of the patterns.

At step 104, the animals pass by a detector that includes a depth camera and that also acquires IR, UV, or color/optical images. The depth camera may be, for example, a an optical passive stereo "3D" camera, a Time of Flight camera (e.g., continuous wave time of flight), or a structured light 3D IR depth camera (such as an Intel RealSense camera, Azure Kinect DK camera). The additional IR, UV, or color images may be acquired by the depth camera itself, or may be acquired by a separate camera. The markings applied to the animals will be present and detectable in the IR, UV, or color/optical images.

At step 106, the outputs of the cameras may be stored in a memory in the form of video clips or timeseries collections of images of a certain duration (e.g., corresponding to a movement of an animal) and provided to a software application for purposes of landmark detection. The markings (such as wax crayon marks) applied in step 102 are selected so that they will show up as relatively distinctive dark marks in a given image modality, such as IR, optical, or UV. It is possible, although not necessary, for the landmark detecting software application to distinguish between marks, or even between marks and other dark/highlighted spots otherwise appearing in images of the animals. In some embodiments, the application may simply comprise a simple but precise mark center detector that operates only in IR. Utilizing this approach in one experiment, it was sufficient for the inventors to have a human label roughly 100 images of pigs in various poses and image locations. To keep the task simple, and reduce computational needs, the application could be programmed not to attempt to filter out other marks (such as numbering on the back of the animals) and so other marks with similar appearance are given zero weight during training to avoid affecting the detector. In one embodiment, the landmark detection software may be a computer vision technique that automatically finds spots, dots, or other locations highlighted in the images due to the markings applied to the animals. In another embodiment, the landmark detection software may be a user interface that allows a user (e.g., by touchscreen, mouse, or other tools) to select and highlight the markings in the images. Additionally, another aspect of step 106 may include detecting a number, barcode, pattern, shape, or other identifier of the animal or subject of interest. For example, when the markings are applied to an animal to designate landmarks of interest, a identifier could also be placed upon the animal (such as, e.g., a unique combination of letters or numbers).

At step 108, the highlighted markings in one or more images of a video clip are identified and given labels. In one embodiment, a user interface may be provided that allows a user to tag the markings as corresponding to structural landmarks of the animal. For example, the user may designate a marking as being a front left shoulder, an end/tail, a last rib, or other location as further described herein. These designations may be predetermined and tailored to the type of animal being monitored and the specific attributes desired to be assessed from the images, as further described below. In another embodiment, the identity and labels of the markings could be automatically predicted according to their relative positioning and pattern. For example, referring to FIG. 2B, the highlighted markings shown on the animal generally follow a pattern given the known physiology of the animal. For example, three markings might always appear in a close, in-line association at the animal's last rib. Or a triangular pattern falling within known sizes may generally be observed from the tail and rear hip markings. From this a priori knowledge of how the patterns should appear represent, an automated process can determine the direction the animal is facing in one or more images of a video clip (e.g., based on knowing that the three in-line markings typically will represent the rear half of an animal) and the various marking identities can be determined. A human user could confirm some or all of the automated identifications.

At step 110, the landmark identifications from one image of a video clip are associated with corresponding landmarks in the other images or frames of the same video clip using an optical flow technique as further described below.

At step 112, the identified landmarks are transposed from the IR, UV-illuminated, or optical images/frames onto the corresponding frame of the video clip on a timeseries basis, as further described below.

Figure 5A:
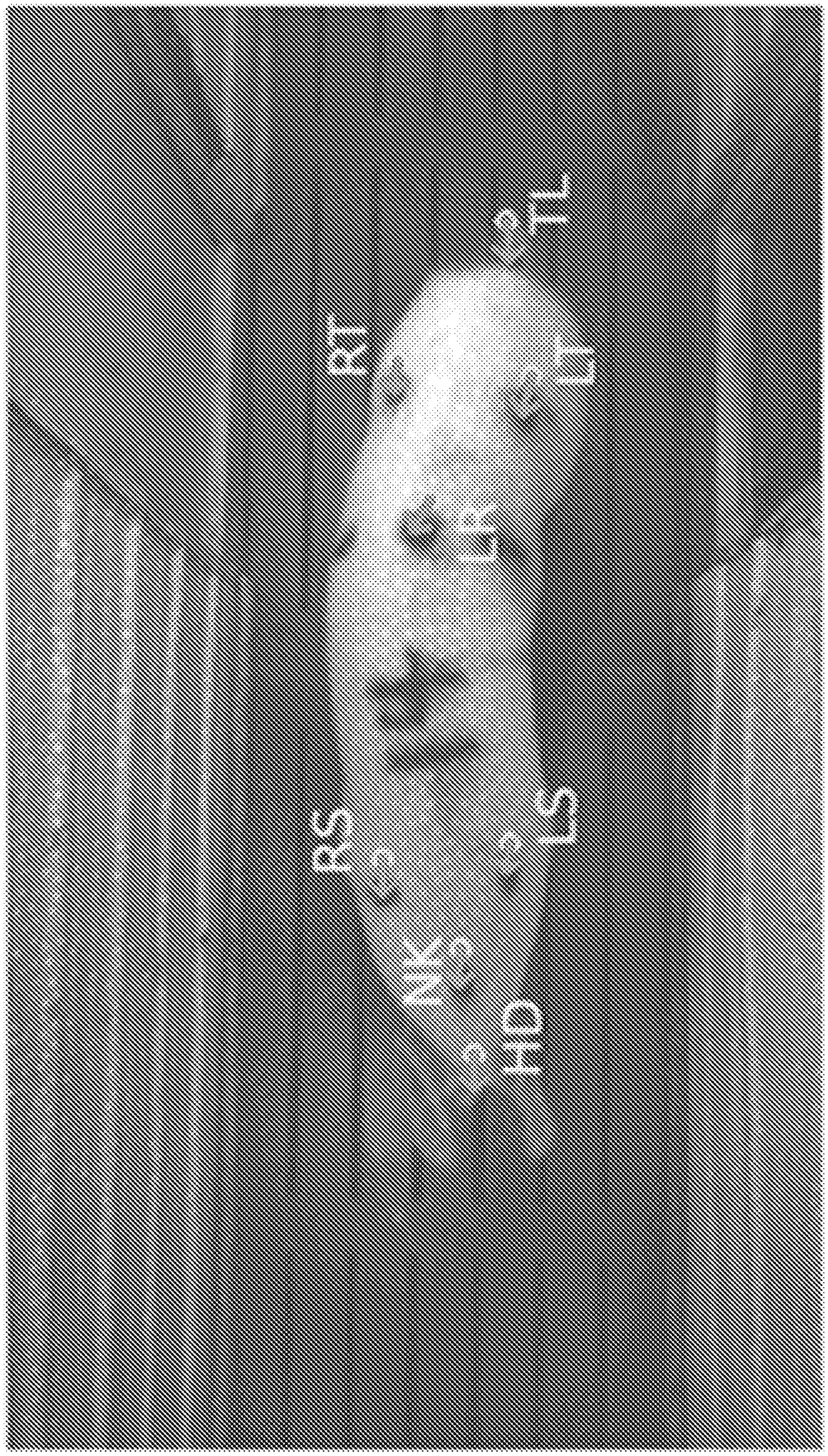
FIG. 5A is an example of an optical flow in the forward direction propagating landmark IDs from the previous image to a matched landmark location.
Figure 5B:
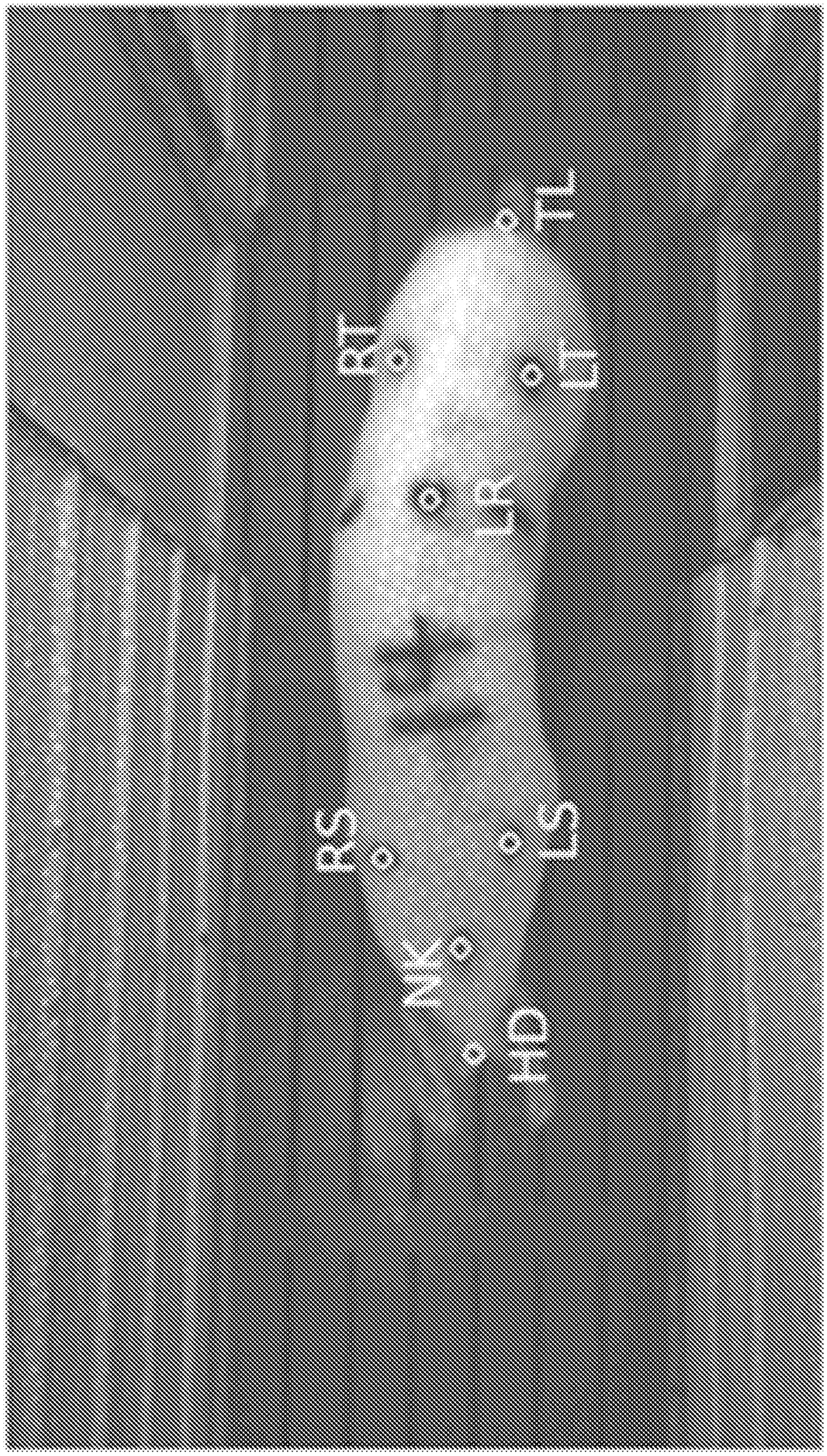
FIG. 5B is an example of a human annotated image including IDs assigned to each of eight landmarks.
Figure 5C:
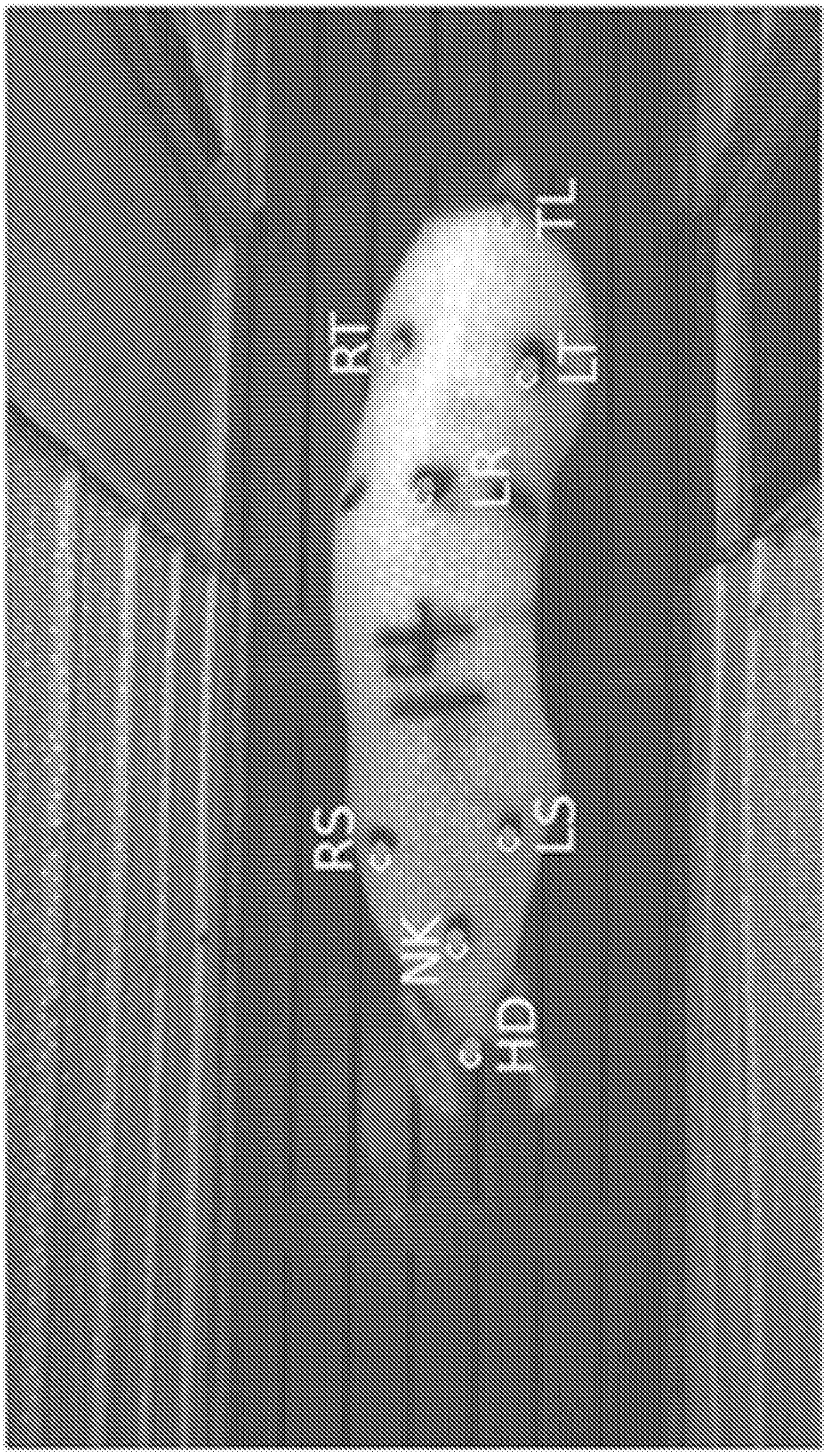
FIG. 5C is an example of an optical flow in the backwards direction propagating landmark IDs from the previous image to a matched landmark location.

Referring now to FIG. 2, depictions of the results of the marking, landmark detection, identification, optical flow, and transposing steps are shown. In FIG. 2A, one example of markings made on a pig using a wax crayon can be seen in an IR image. In FIG. 2B, the result is shown of an automated landmark detector having been applied to the IR image. The landmark detector included a center-detection step, which allows for a colorized "heat map" manner of highlighting the landmarks in the image. In FIG. 2C, the result of an identification process is shown, in which the various landmarks are identified and tagged. In FIG. 2D, a depiction of the optical flow technique is shown in which the landmarks or landmark-centers are determined as having moved from frame to frame of a video clip, and the associated identifiers are applied in the subsequent and/or previous frames of the clip. FIG. 5A-C further depicts an additional example of an optical flow technique, in which centers of markings are tracked from one labeled IR image, to both a subsequent (FIG. 5A) and previous (FIG. 5C) frame within a video clip of a pig movement. In FIG. 2E, the result is shown of having transposed the identifiers from the images in FIGS. 2B-2D onto a depth image of the same animal at the same or approximately the same moment of the animal's movement being monitored.

Figure 3:
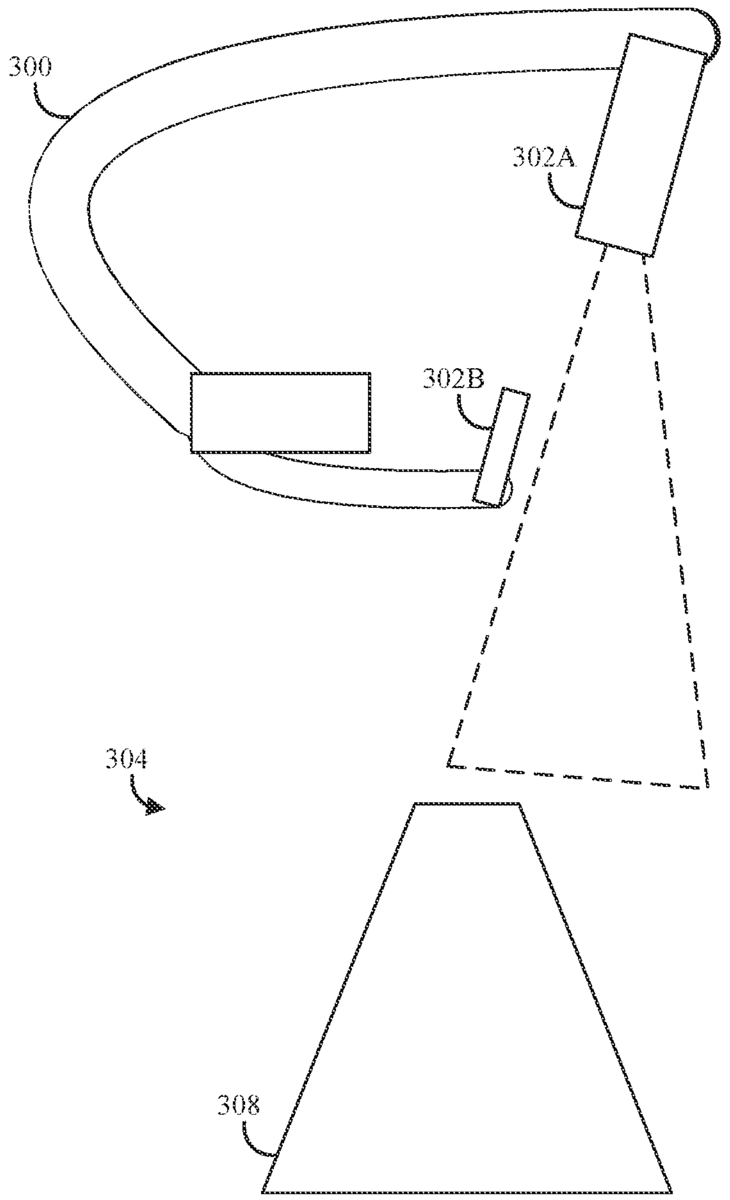
FIG. 3 is an example of a data collection system setup.

Referring now to FIG. 3, an example of a data collection system 300, which can obtain video and image data (such as for step 104 of the method described above), may comprise a fully enclosed system, comprising a processor and module board, memory such as hard drives, and a pair of depth cameras 302A, 302B, such as Intel RealSense cameras and Azure Kinect DK camera. These cameras provide both IR and depth images by projecting a dot pattern for depth calculation. The system 300 is shown as being suspended from the ceiling within a hallway 304 of a barn or other area of a farm. This system 300 is placed such that the cameras 302 are non-intrusive and provide full coverage of animal movement in the hallway 304. For example, the system 300 can track movement of animals through on a floor 308 of the hallway 304. As animals are moved from one area to another during normal farm operation through this hallway, this location is allows a suitable place for collecting and analyzing kinematic motion.

Figure 2A:
FIG. 2A is an example of infrared image of a pig showing black dots where wax crayons marked the joint locations.
Figure 2B:
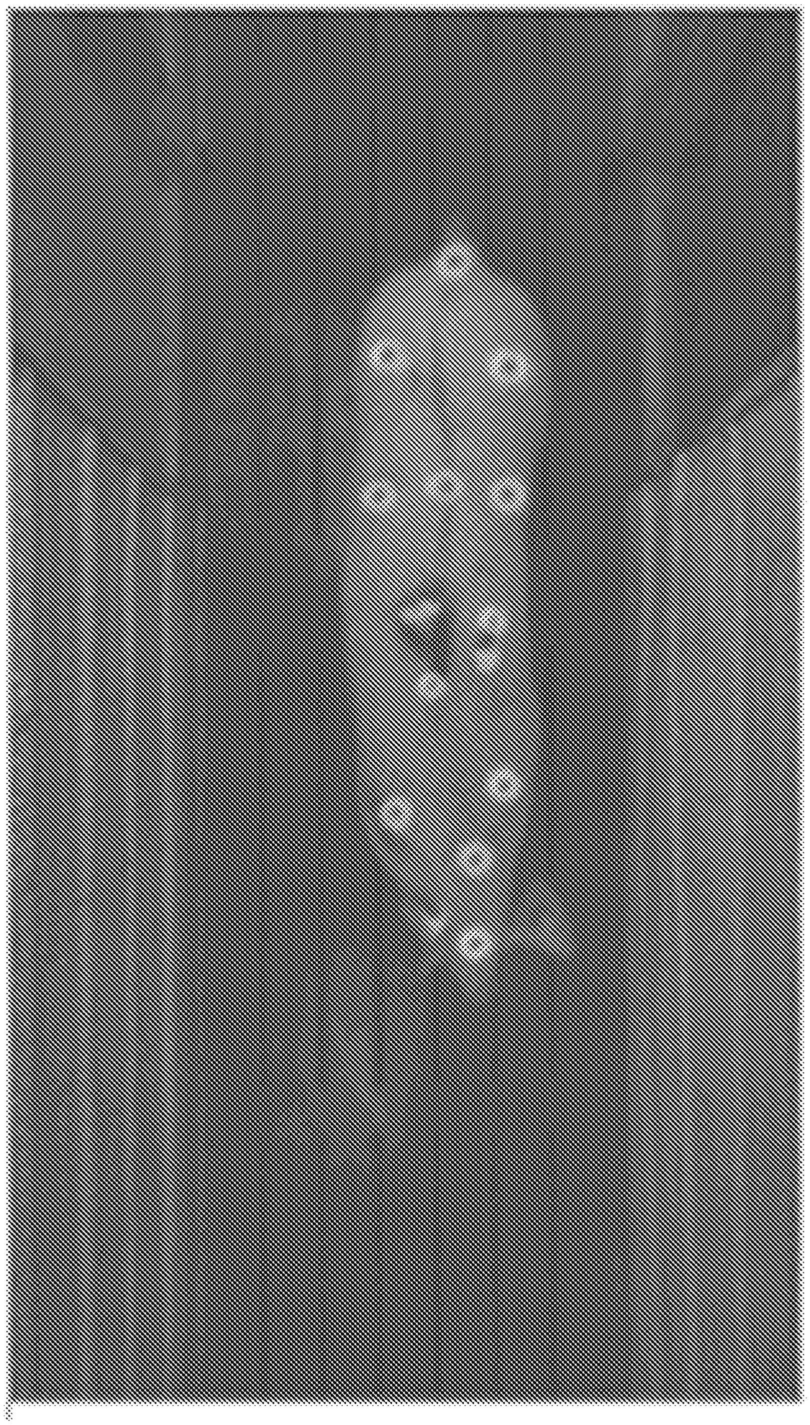
FIG. 2B is an example output of a landmark center detector shown as an overlaid heatmap.
Figure 2C:
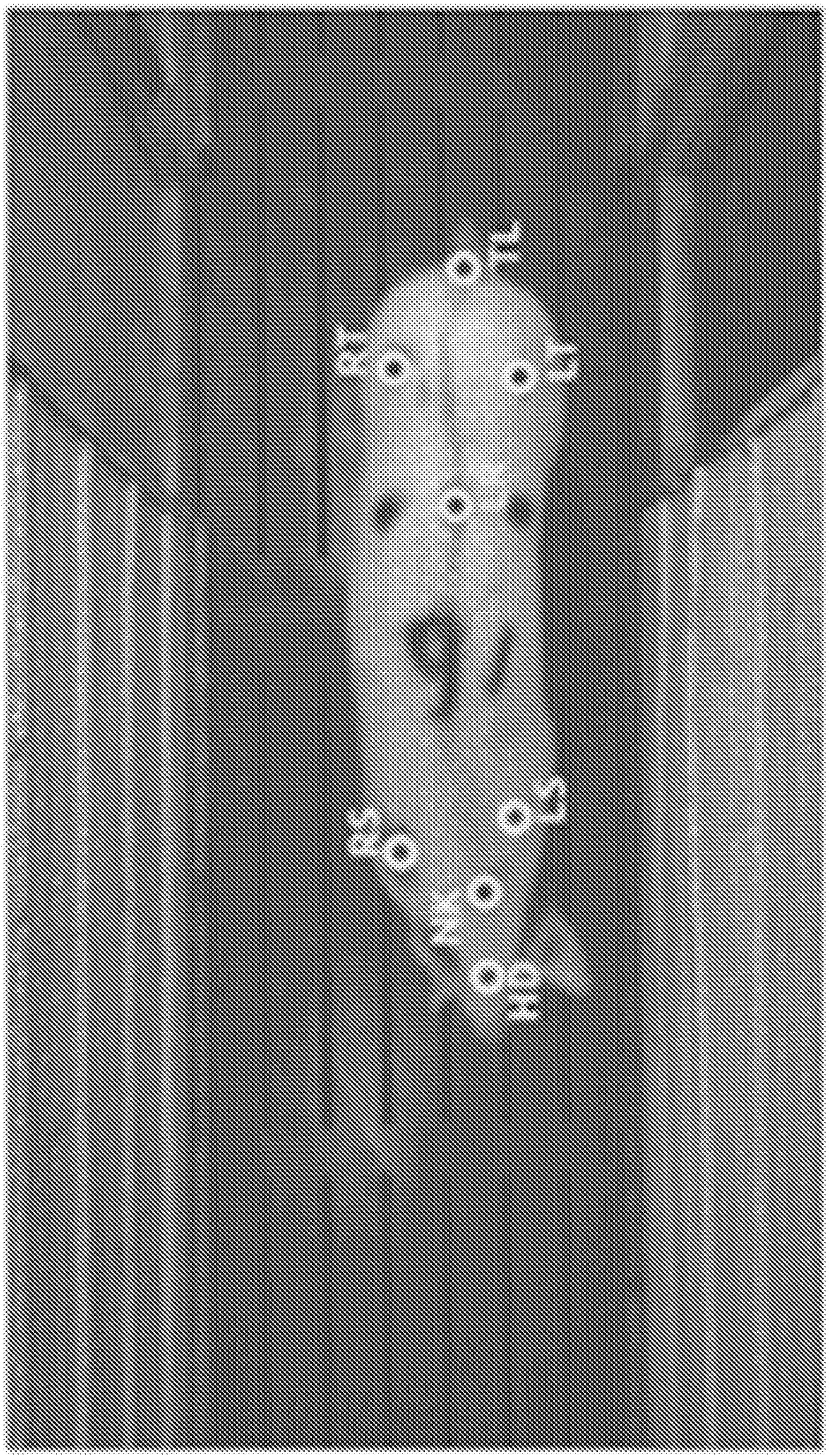
FIG. 2C is an example of a human annotated label IDs on joints used for pose estimation.
Figure 2D:
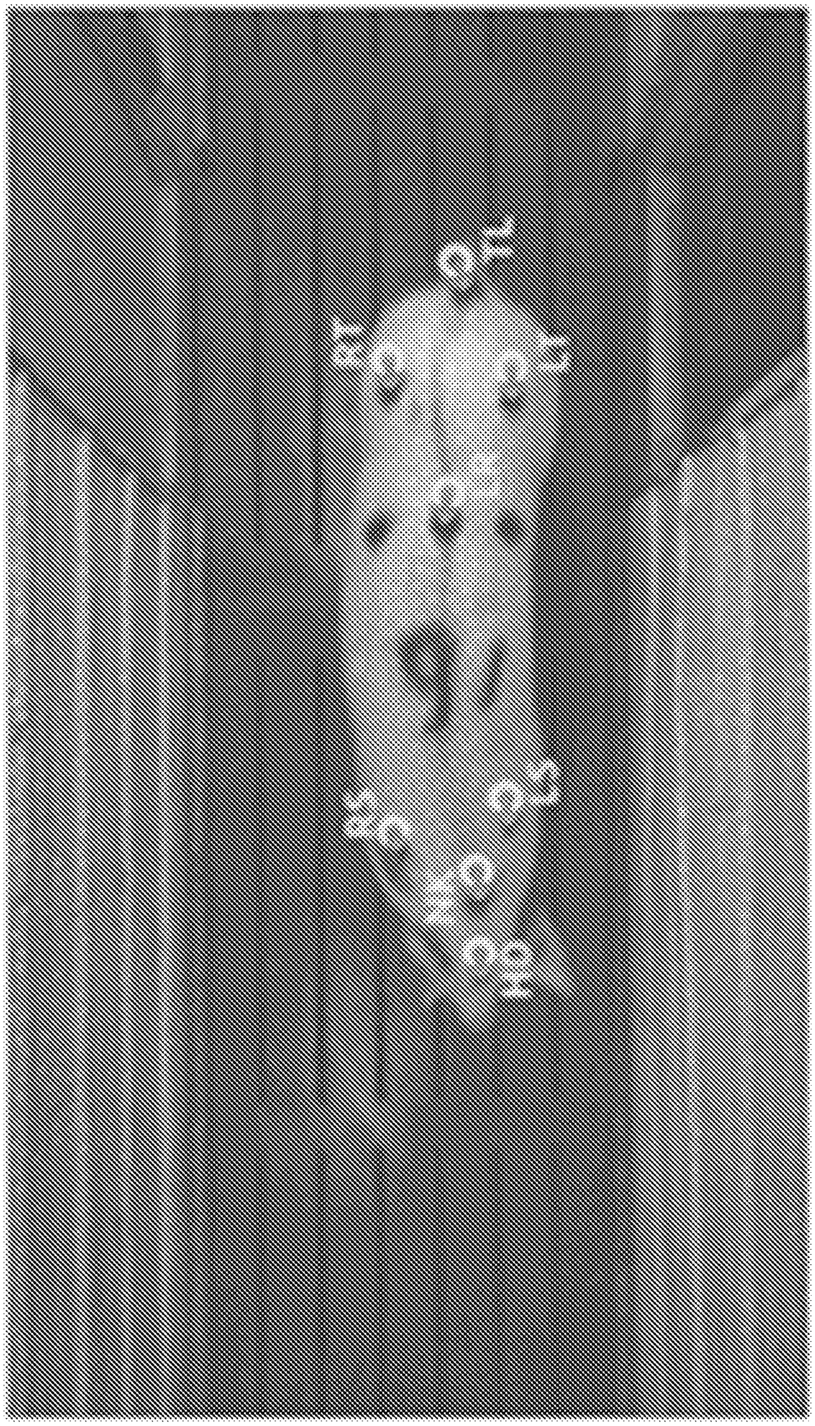
FIG. 2D is an example of an optical flow automatically associates labels with other images of a pig in the video sequence.
Figure 2E:
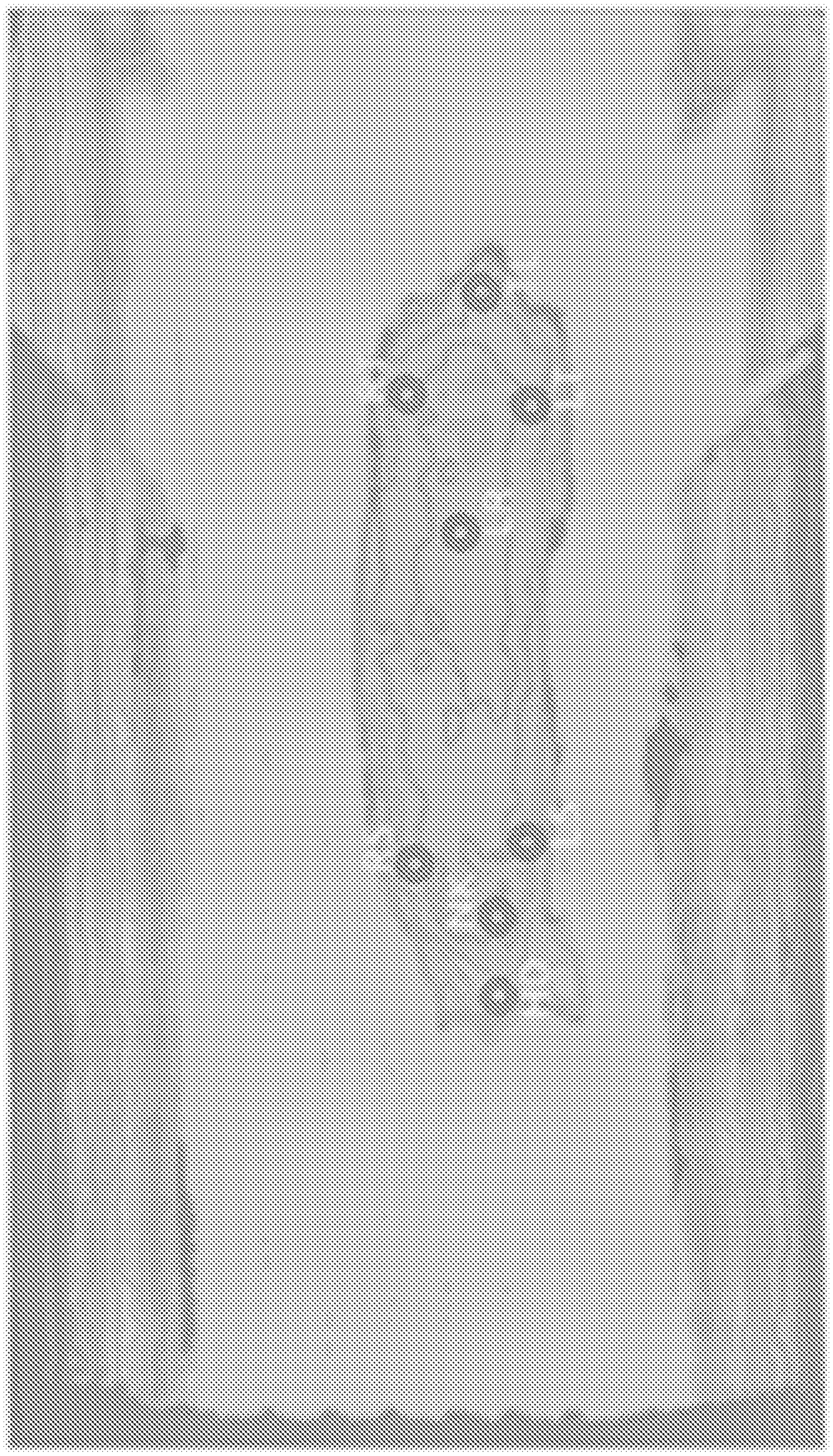
FIG. 2E is an example of a transfer of all locations and IDs from each infrared image to a corresponding depth image. These transferred points are used to supervise deep learning methods to predict landmarks locations on unmarked pigs.
Figure 4:
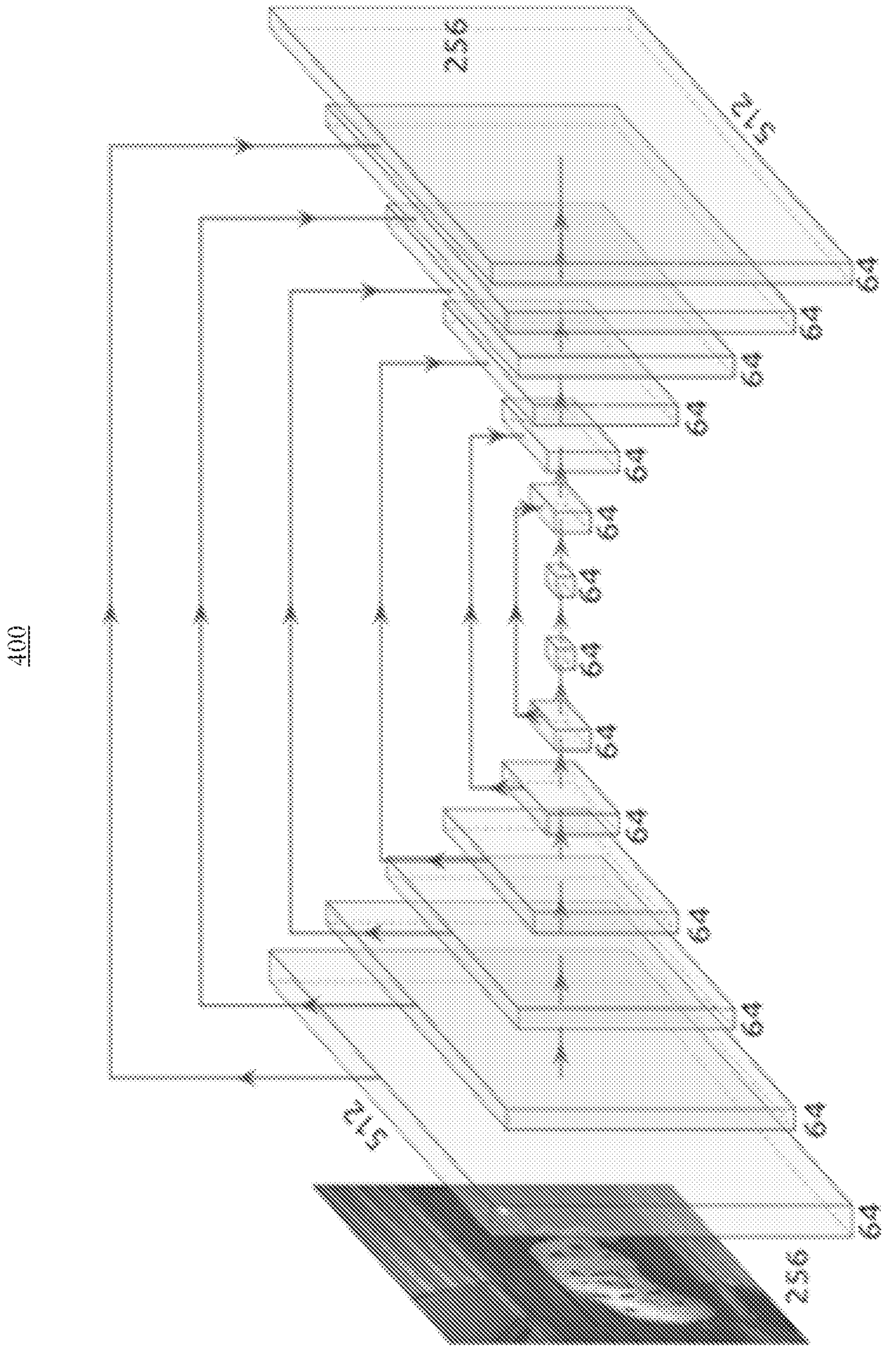
FIG. 4 is an example of an encoder-decoder network configuration for mark detection within IR images.

Referring now to FIG. 4, a visualization of a neural network 400 is shown, designed for mark detection such as in step 106 above. The neural network uses an encoder-decoder structure consisting of a set of three convolution+batch norm+relu operations for each tier, each having sixty-four channels. This network combines features across multiple resolutions to accurately locate mark centers. The network input can be, for example a single grayscale IR image, or a grayscale UV image, or a color optical image. The label image is zero everywhere except for unit-height Gaussians with standard deviation of 6 pixels around the center of each joint location. This label represents the probability of being a mark center $y_i$ for each pixel i. This label represents the probability of being a mark center $y_i$ for each pixel i. The network 400 predicts a single channel output image denoted $z_i$ for each pixel. A weighted continuous cross-entropy loss is used for training and is specified as:

$$L_{CE}(z_i, y_i) = \sum_{i=1}^{N} w_i(-y_i z_i + \log(1 + e^{z_i})) \tag{1}$$

where $w_i$ is the pixel weight. This is minimized when the sigmoid of $z_i$ is equal to $y_i$. Here the pixel weight is chosen to balance the contribution to the loss of the small number of pixels on marks with the far greater number on the background. An example output, shown as a heatmap over the input image, is shown in FIG. 2B. Joints locations are predicted at the peak locations of the output $z_i$. A separate label image channel is used to represent each mark or joint for both the label and the prediction.

After the detection of marks on an animal, identification tagging of each joint is performed as described above. One approach to achieving this is to label an image where all joints are visible and to use pairwise optical flow to propagate these IDs forward and backward through a sequence. In one embodiment, a Deepflow application may be utilized, as it has high accuracy with large displacements which can occur when pigs run. An example is depicted in FIG. 5A-C.

However, if only optical flow were used to propagate labels, mark locations could, in some embodiments under some circumstances, drift and error could accumulate. Thus, one approach avoids this by relying on the mark detectors using the IR image for location and on the optical flow only for propagating marker ID. Algorithm 1 outlines how this is done. A visualization of marking detection can be seen in FIG. 2B.

Algorithm 1 Landmark ID labeling and association

```
Input: {I_0, . . . I_i, . . ., I_n} as image sequence
for every image I_i in the sequence do
  if I_i == I_0
    human assigns IDs to marks on I_i
  else
    M ← do mark detection on I_i
    F ← do optical flow between I_{i-1} and I_i
    for number of joints do
      joint_flow ← F (joint)
      search for local max on M around joint_flow
      assign max as new joint
```

-continued

Algorithm 1 Landmark ID labeling and association

```
      end for
    end if
  end for
Return: joints
```

Figure 6:
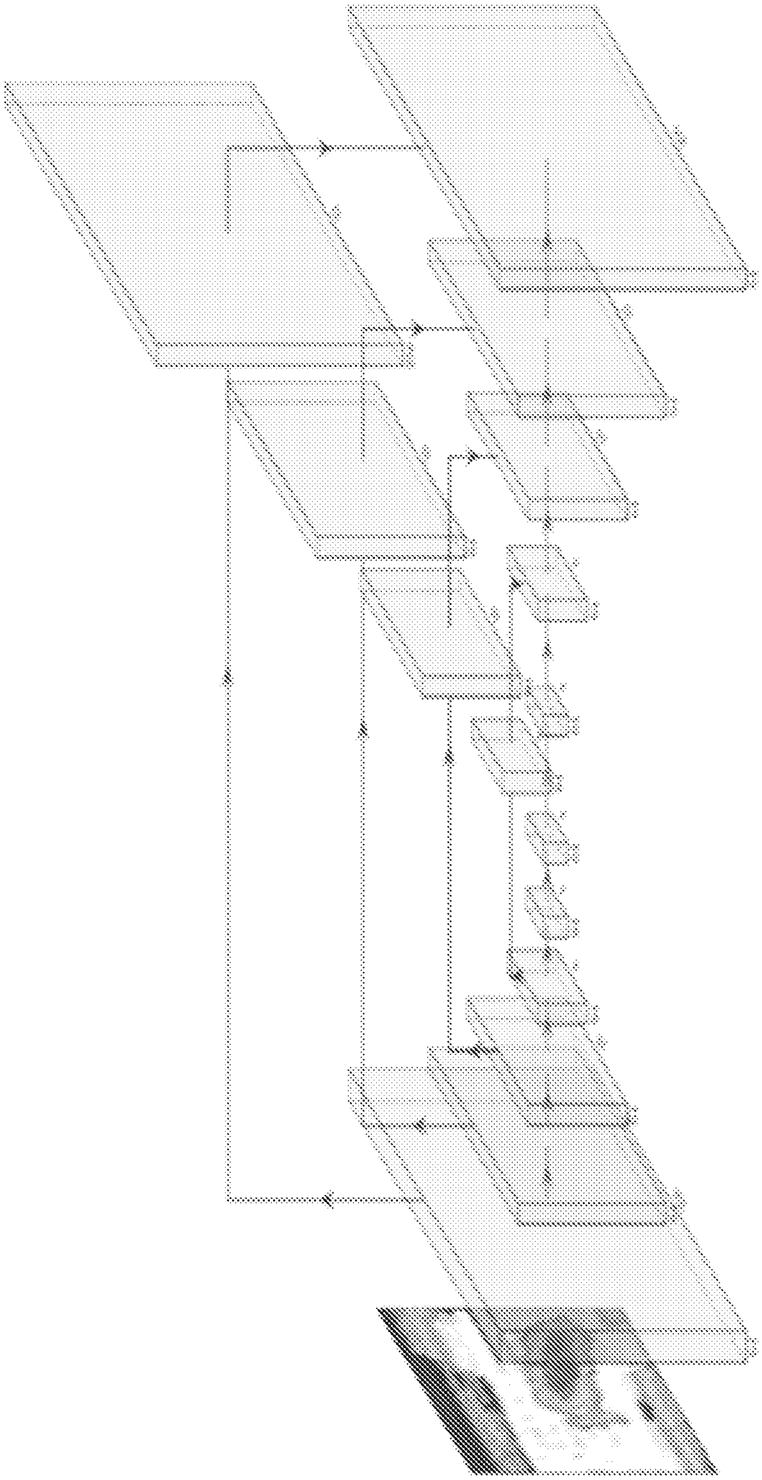
FIG. 6 is an example of an hourglass structure network for depth-based pose estimation.

Referring now to FIG. 6, for the task of depth image pose detection, a stacked hourglass model 600 may be used, as it analyzes spatial relationships on the pig. The model 600 is similar to the architecture seen on FIG. 4, but with modifications to the skip connections, intermediate supervision, and the stacking of two hourglass networks, as shown in FIG. 6.

In one experiment, the inventors utilized an implementation of this network that was consistent with a typical Stacked Hourglass Networks for Human Pose Estimation, but with the modified continuous cross-entropy loss function from Equation 1 instead of a MSE loss. As with discrete cross entropy, this loss has the advantage of maintaining gradients even when the loss is small, and so encourages better convergence. In one embodiment, the network utilized could comprise two stacked hourglass components with 128 channels for each. The output of each hourglass is monitored and loss is evaluated to verify convergence.

Experimental Results

Palpation was used to identify 8 consistent joint locations on 158 pigs and locations were marked with a wax crayon. Over three sessions, a dataset of 20 k instances of these pigs walking or running down a hallway was collected. Both infrared and depth obtained from two RealSense™ cameras were stored. These sequences were partitioned into 10% testing, 10% validation and 80% training for all neural network processing. For the IR mark detection network, a random selection of 150 images were hand labeled using a custom labeling program. Once the IR-mark detector network is trained, it is used to find marks in the remainder of the IR images. A human labeler selects the marks corresponding to the 8 true landmarks and this selection is propagated through each video sequence. The previously marked ground truth locations are used to evaluate this procedure.

The output of the mark detection network can be seen in FIG. 2(*b*). The network captures all of the indicated joints with multiple false positives. These detections are not a major concern as the fusion algorithm (Alg. 1) will filter out non-landmark detections throughout the image sequence.

Figure 7:
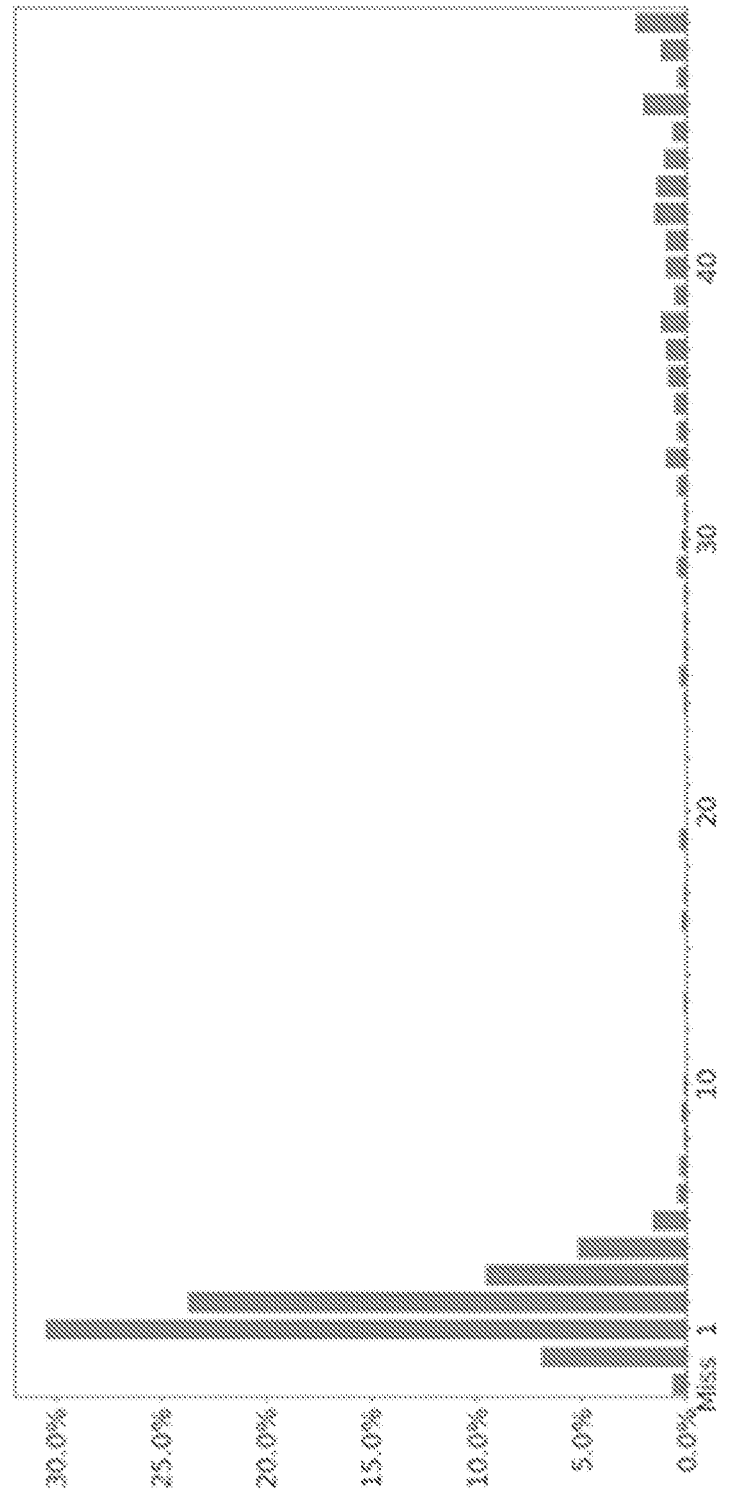
FIG. 7 is a histogram of errors in estimating visible landmark centers in IR images.

Evaluation of the mark detection network can be calculated based on the Euclidean pixel distance between a human labeled test set and the output of the network. The mark pixel of the network generated mark is determined by creating a search area around the ground truth point and determining the most probable pixel. Missed detections are calculated if the maximum probability output of that region is lower than 0.3, then it is deemed a miss. FIG. 7 is a histogram of the distance error in pixels and the relative frequency of occurrence. The results show that the detection error is within a tolerance of 5 pixels with 95% confidence region for a 480×848 pixel resolution image. The missed detection rate is <3%.

The 2D skeletal pose is then obtained for a frame of a video clip by associating joints with detected marks in the IR images (such as those in FIG. 11). Then, these label IDs are propagated forward and backward in time for the full observation of a pig. There is no accumulated drift from flow as marks are detected in each image, and flow only performs association.

However, there are times when it is possible an association fails (e.g., this may correspond to rapid pig motion or an occlusion of a mark). These instances can be automatically detected when association fails to find a detected mark with a probability peak of at least 0.3 within a 6 pixel deviation where flow predicts its location. In each of those cases, a number of things may happen: a human could prompted to either correct the association or mark it as occluded; or a location could be interpolated and automatically ascribed based upon a determined trajectory (i.e., movement from prior images) and/or a relationship with other marks based up previous images for the same animal. Table I gives quantitative metrics on the number of human interventions involved during labeling in one experiment, showing that less than 1.3% of images required human labeling, confirmation or correction.

TABLE 1

ASSOCIATION RESULTS FOR LANDMARKS IN IR IMAGES. AFTER HUMAN ASSIGNMENT OF IDS, ONLY 1.3% OF IMAGES NEED HUMAN ATTENTION.

| | |
|---|---|
| Number of Pig Traversal Sequences | 158 |
| Average number of Images per Sequence | 126 |
| Average number ot Interventions per Sequence (excluding initial labeling) | 1.5 |
| Success Rate for Automated Association | 98.7% |

C. Joint Detection for Depth Images For joint detection in depth images, a sigmoid function may be applied to the output of a pose-detector network as shown in FIG. 8. Each channel represents the spatial density for a particular joint, and we select the peak as the joint's location. Together these eight locations specify a full 3D skeletal pose estimate of a pig.

Figure 8A:
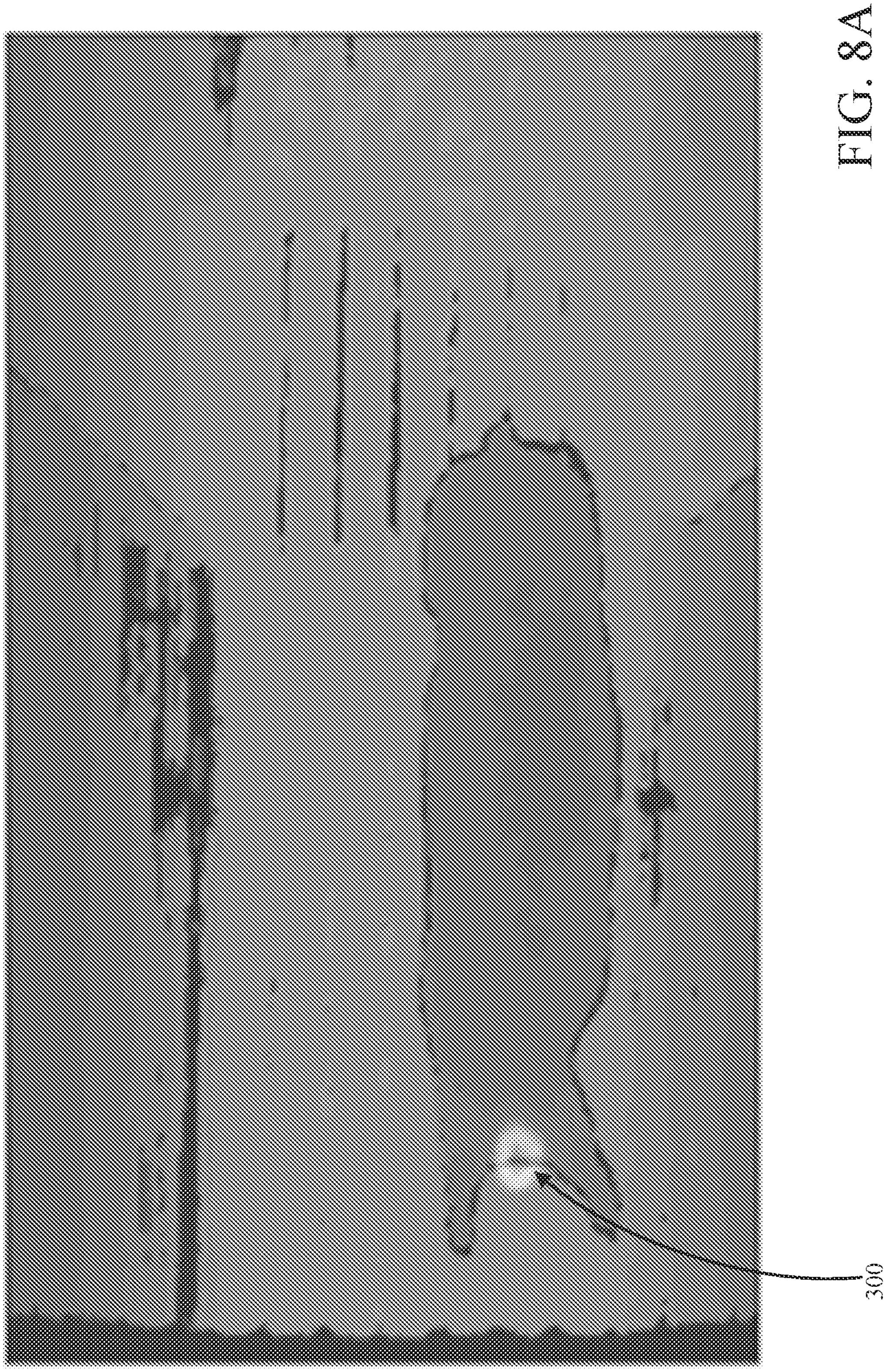
FIG. 8A is an example of an exemplary depth image of a pig overlaid with an estimated probability of a head joint location
Figure 8B:
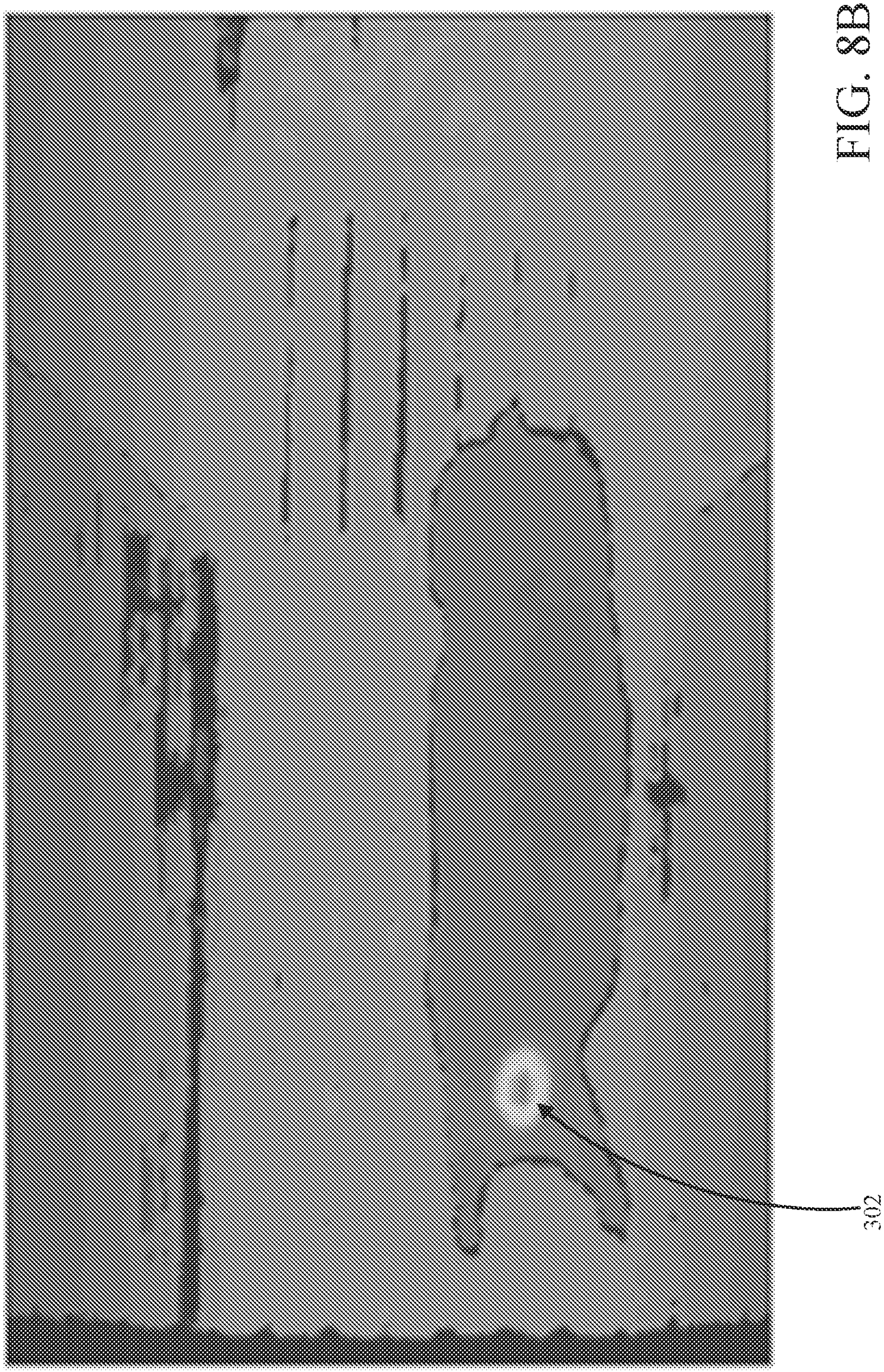
FIG. 8B is an example of an exemplary depth image of a pig overlaid with an estimated probability of a neck joint location.
Figure 8C:
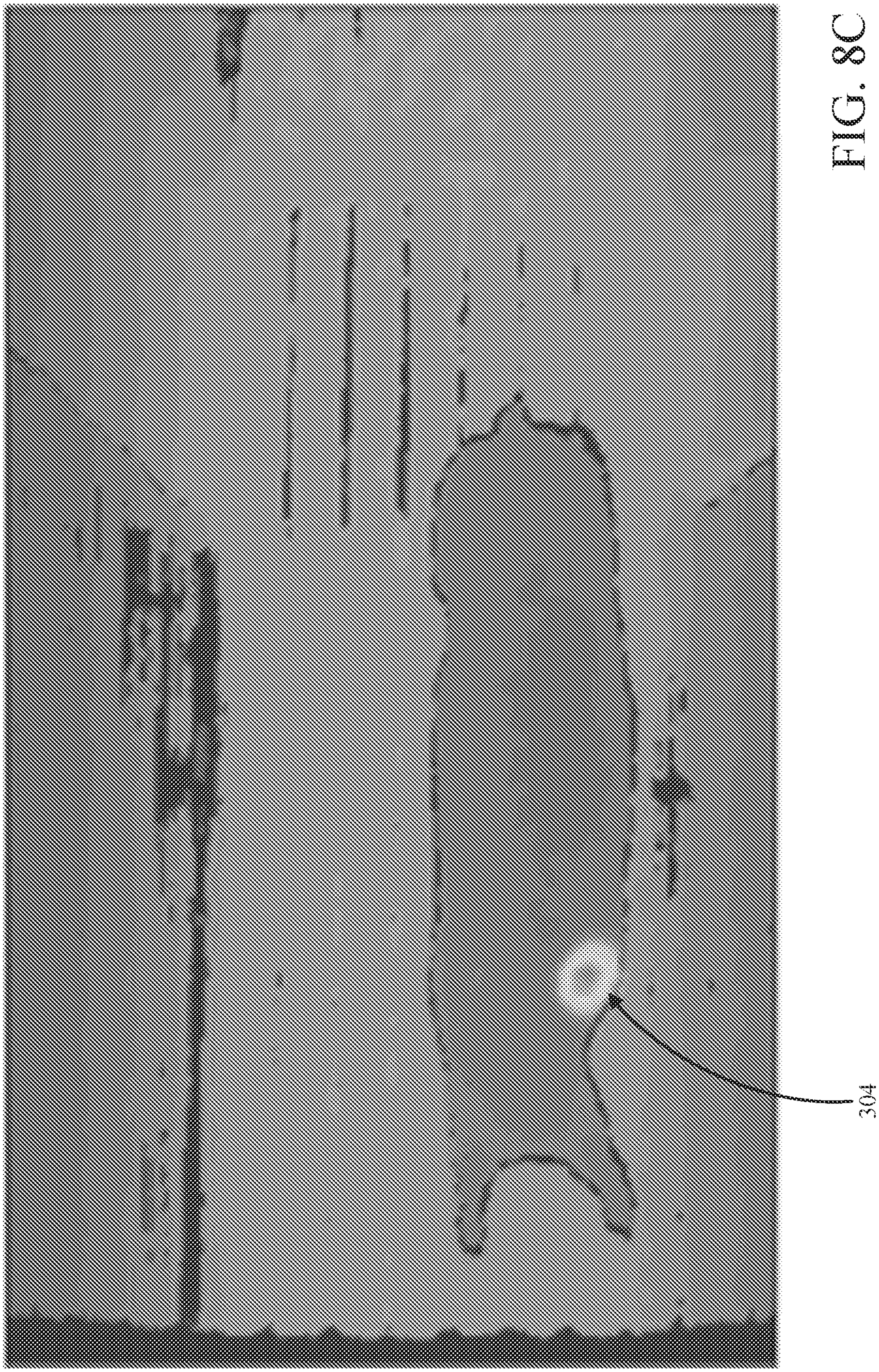
FIG. 8C is an example of an exemplary depth image of a pig overlaid with an estimated probability of a left shoulder joint location.
Figure 8D:
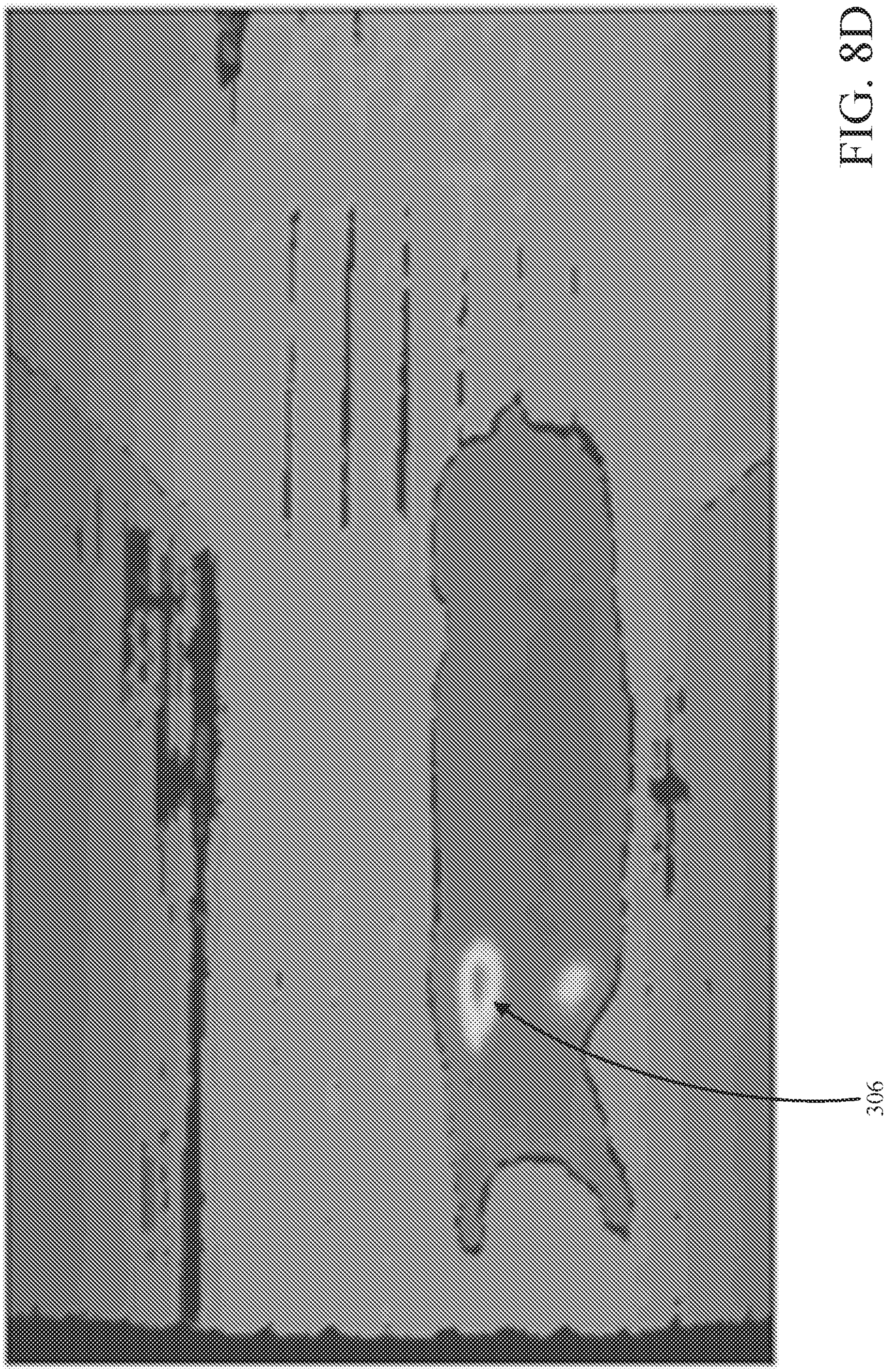
FIG. 8D is an example of an exemplary depth image of a pig overlaid with an estimated probability of a right shoulder joint location.
Figure 8E:
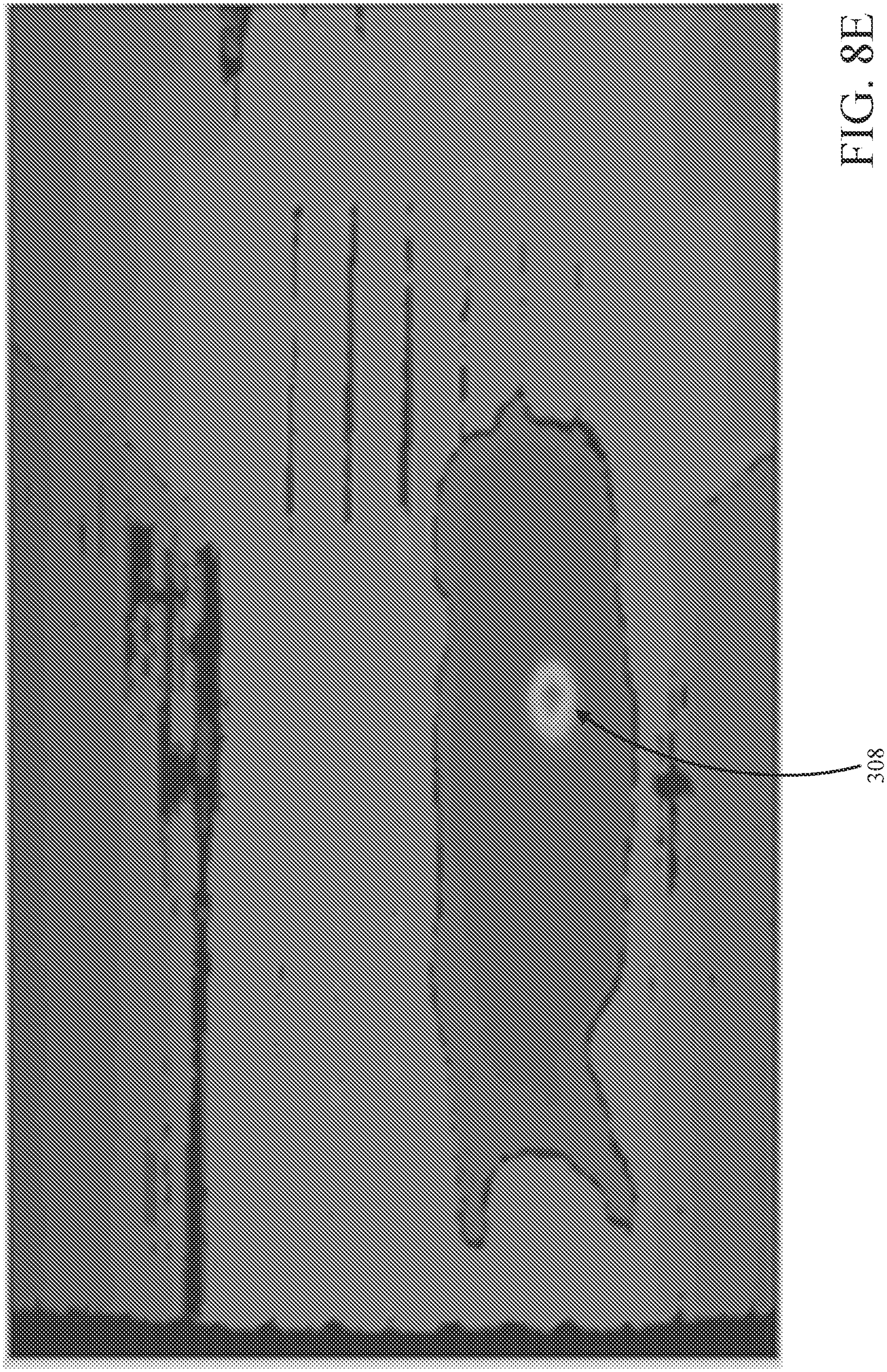
FIG. 8E is an example of an exemplary depth image of a pig overlaid with an estimated probability of a last rib joint location.
Figure 8F:
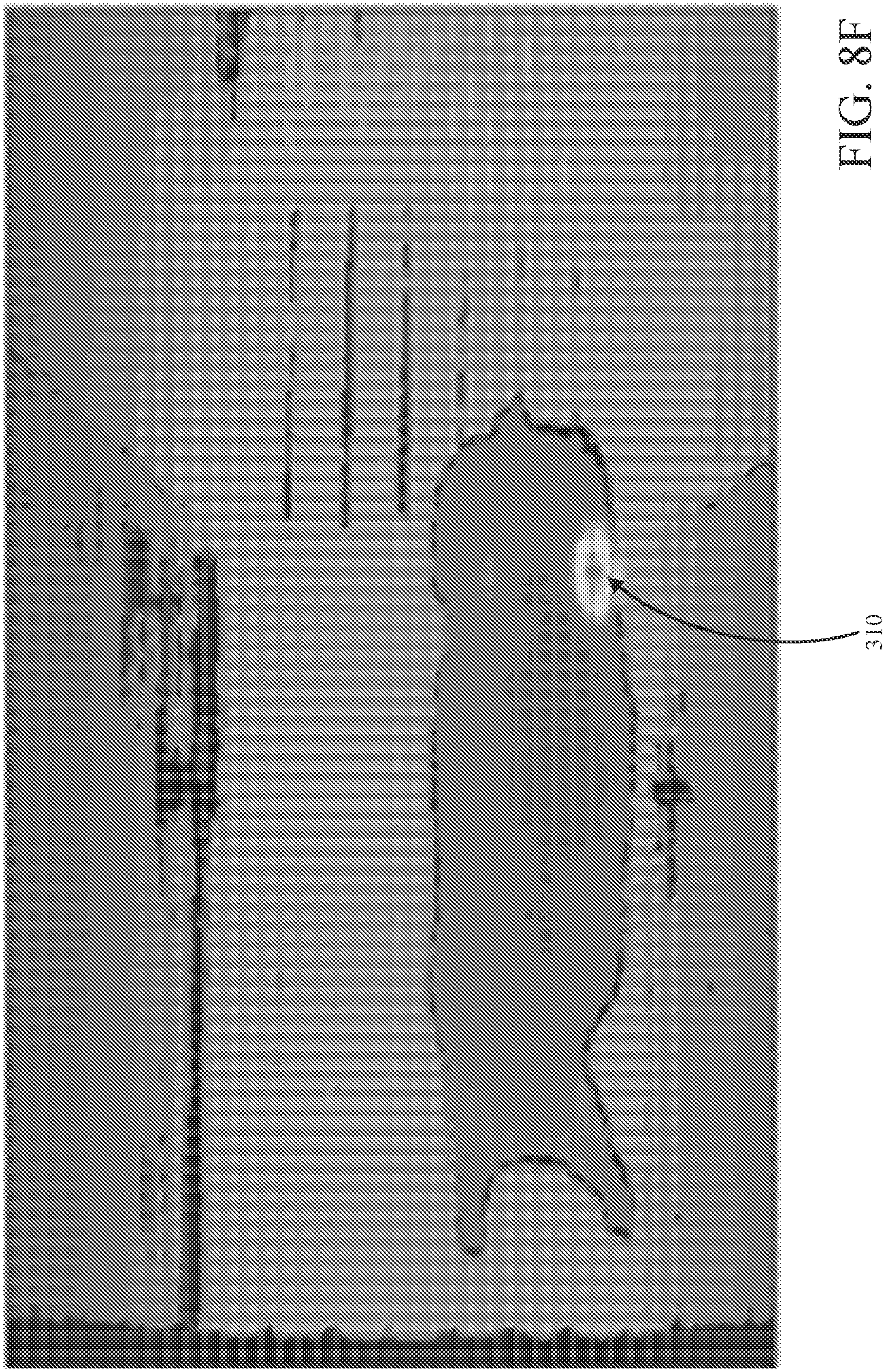
FIG. 8F is an example of an exemplary depth image of a pig overlaid with an estimated probability of a left thigh joint location.
Figure 8G:
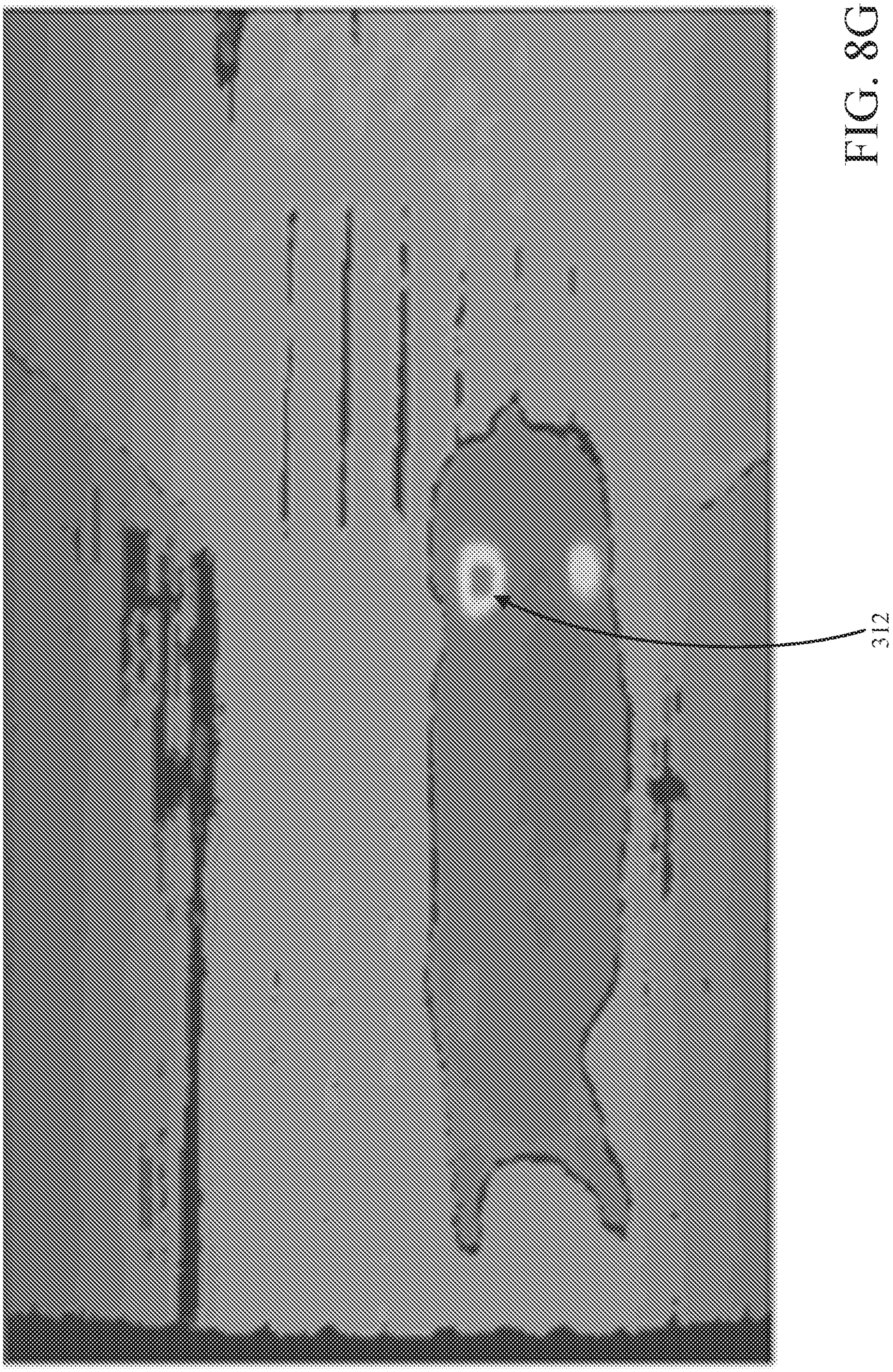
FIG. 8G is an example of an exemplary depth image of a pig overlaid with an estimated probability of a right thigh joint location.
Figure 8H:
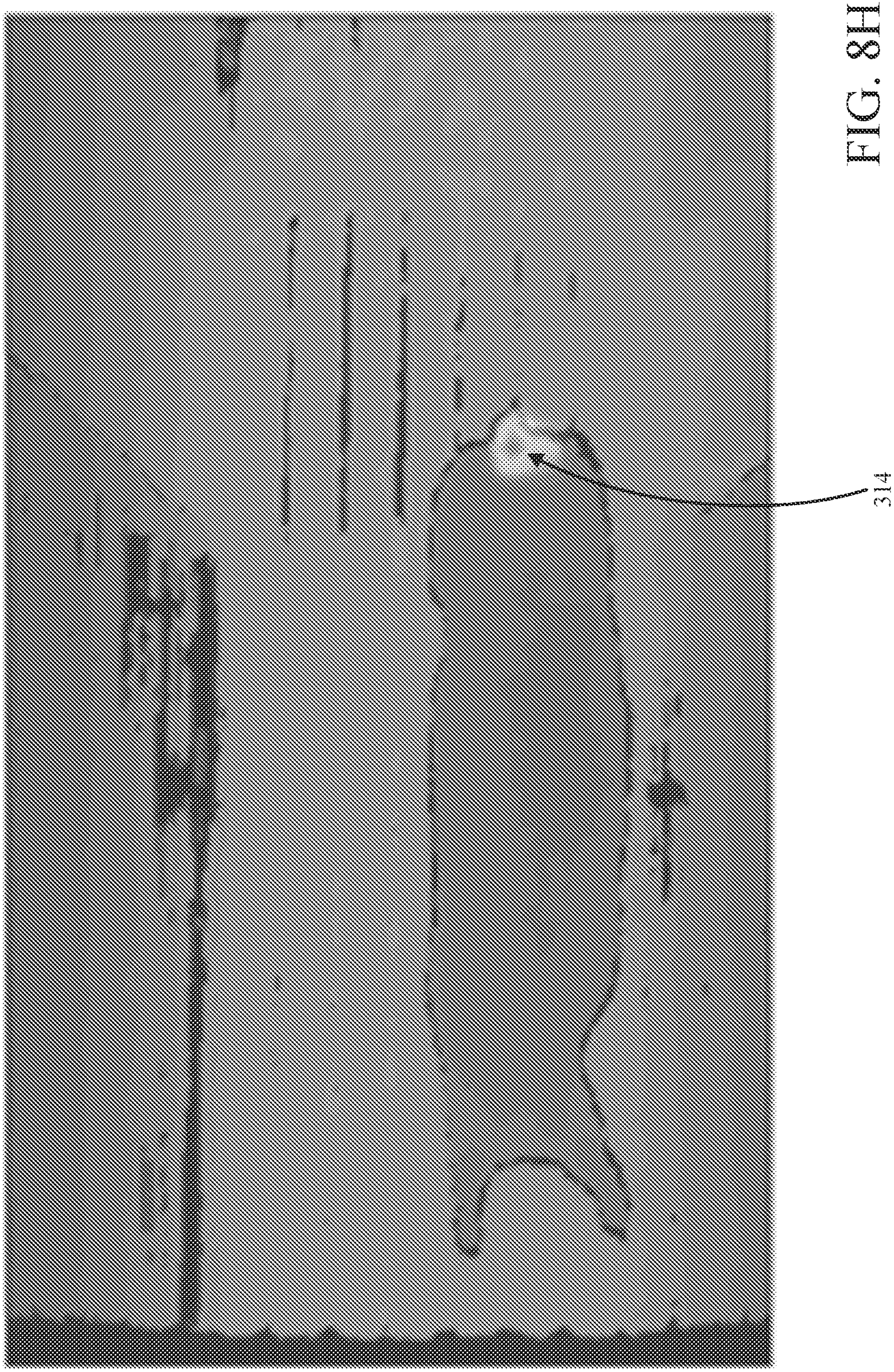
FIG. 8H is an example of an exemplary depth image of a pig overlaid with an estimated probability of a tail joint location.

FIG. 8A is an example of an exemplary depth image of a pig overlaid with an estimated probability of ahead joint location 800. FIG. 8B is an example of an exemplary depth image of a pig overlaid with an estimated probability of a neck joint location 802. FIG. 8C is an example of an exemplary depth image of a pig overlaid with an estimated probability of a left shoulder joint location 804. FIG. 8D is an example of an exemplary depth image of a pig overlaid with an estimated probability of a right shoulder joint location 806. FIG. 8E is an example of an exemplary depth image of a pig overlaid with an estimated probability of a last rib joint location 808. FIG. 8F is an example of an exemplary depth image of a pig overlaid with an estimated probability of a left thigh joint location 810. FIG. 8G is an example of an exemplary depth image of a pig overlaid with an estimated probability of a right thigh joint location 812. FIG. 8H is an example of an exemplary depth image of a pig overlaid with an estimated probability of a tail joint location 814.

Figure 9:
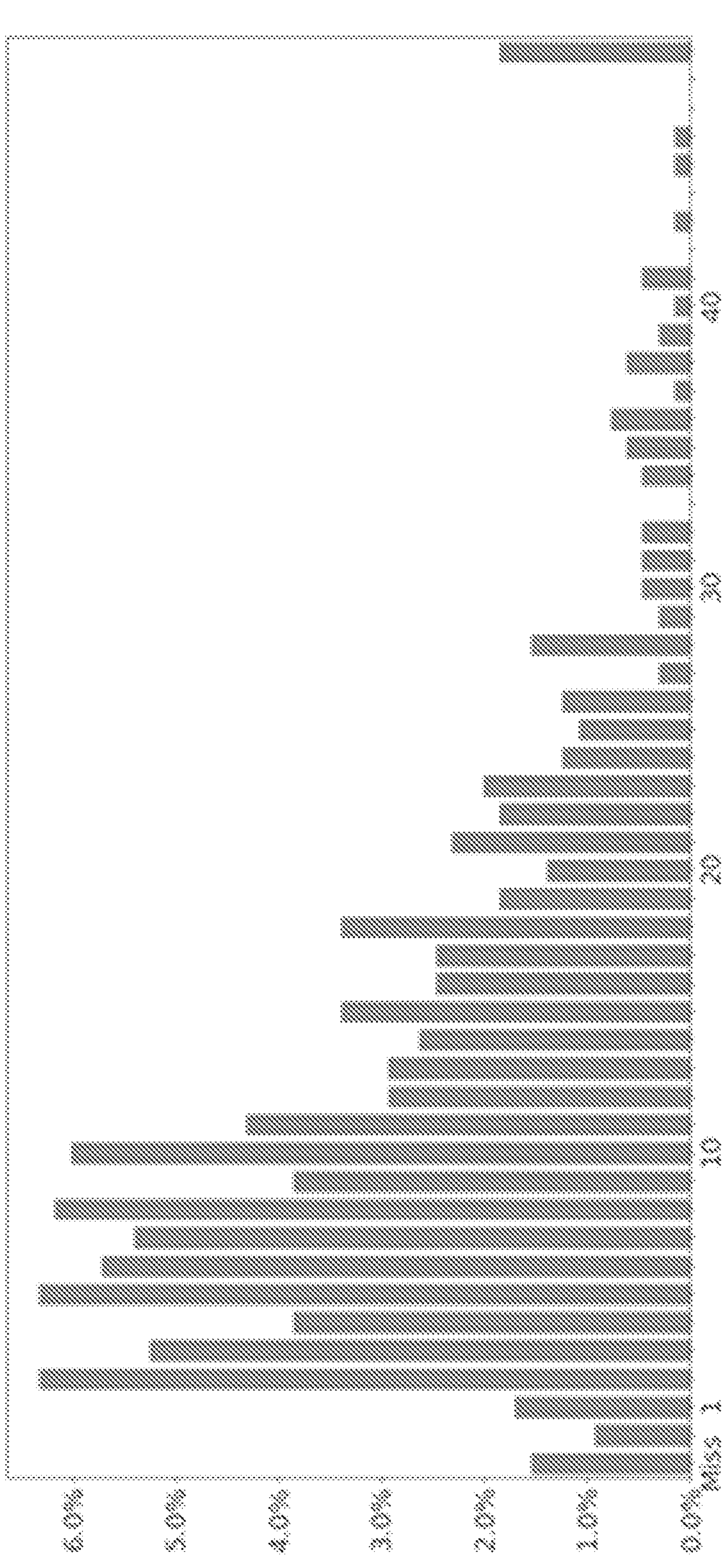
FIG. 9 is a histogram of differences between IR landmark detections and depth landmark detections.
Figure 10:
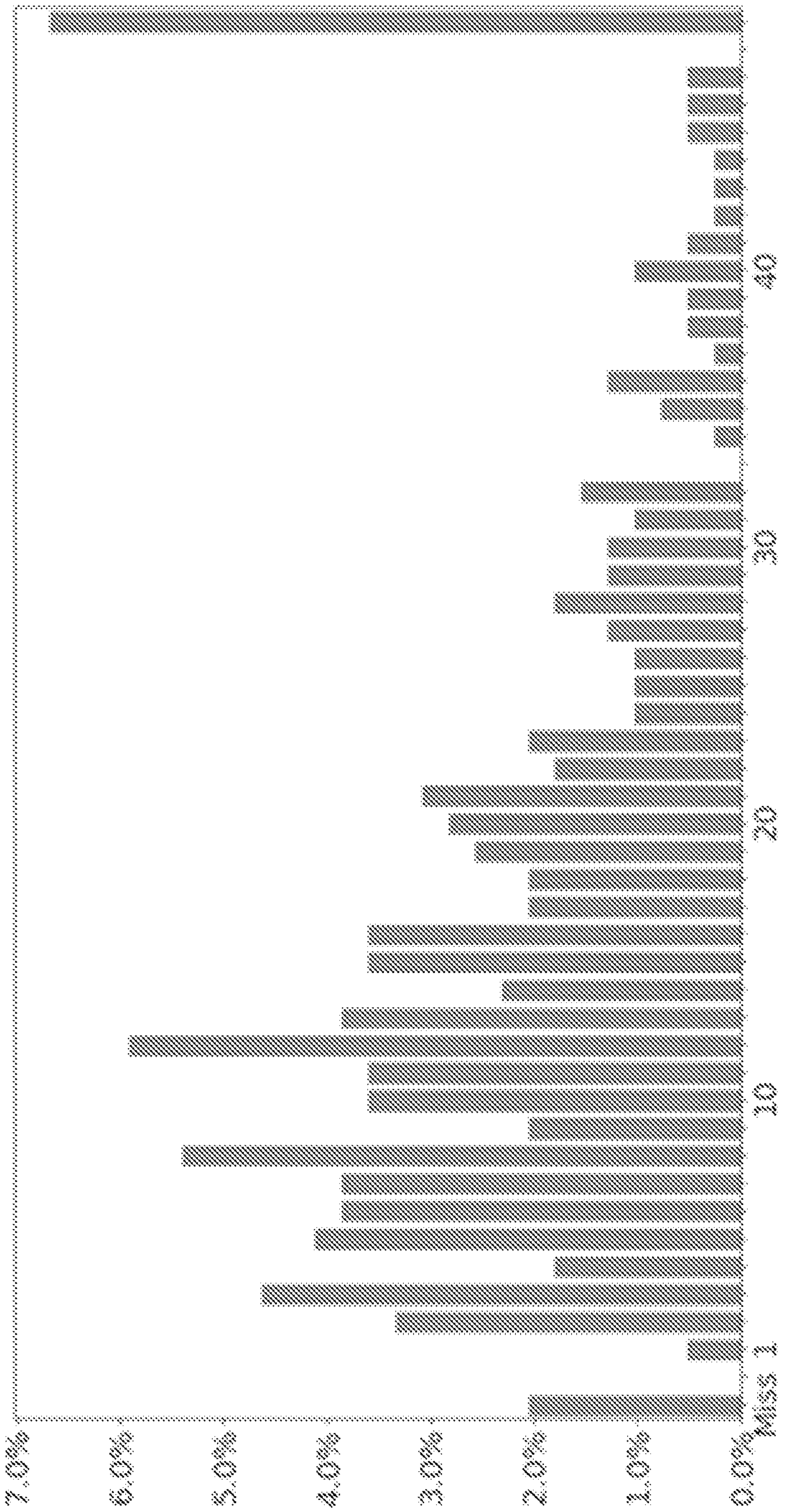
FIG. 10 is a histogram of predicted joint location error from depth-images on the test partition using hand-labeled ground truth.
Figure 11A:
FIG. 11A is an exemplary first set of pose estimates of a pig overlaid on a first depth image frame.
Figure 11B:
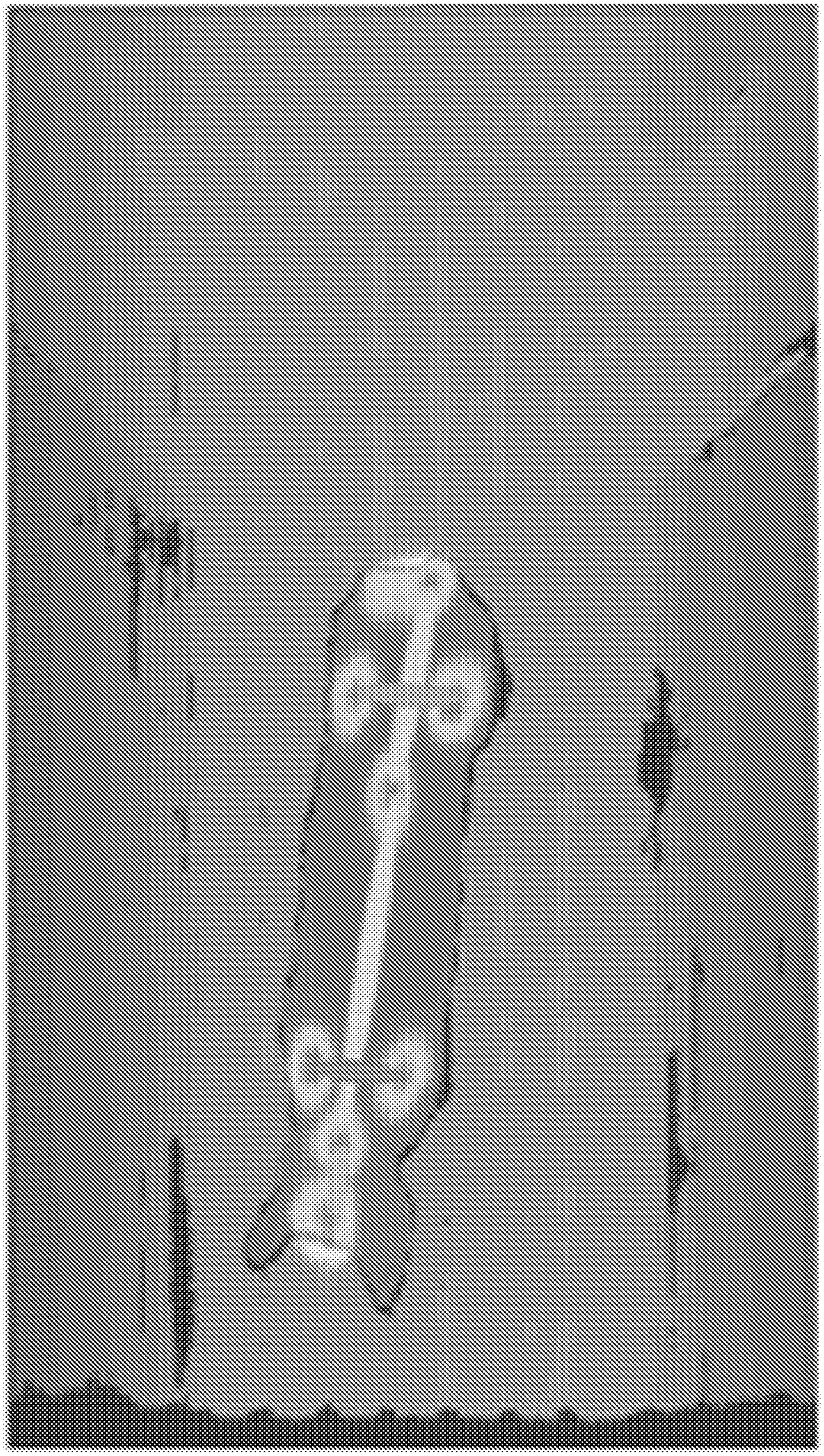
FIG. 11B is an exemplary second set of pose estimates of a pig overlaid on a second depth image frame.
Figure 11C:
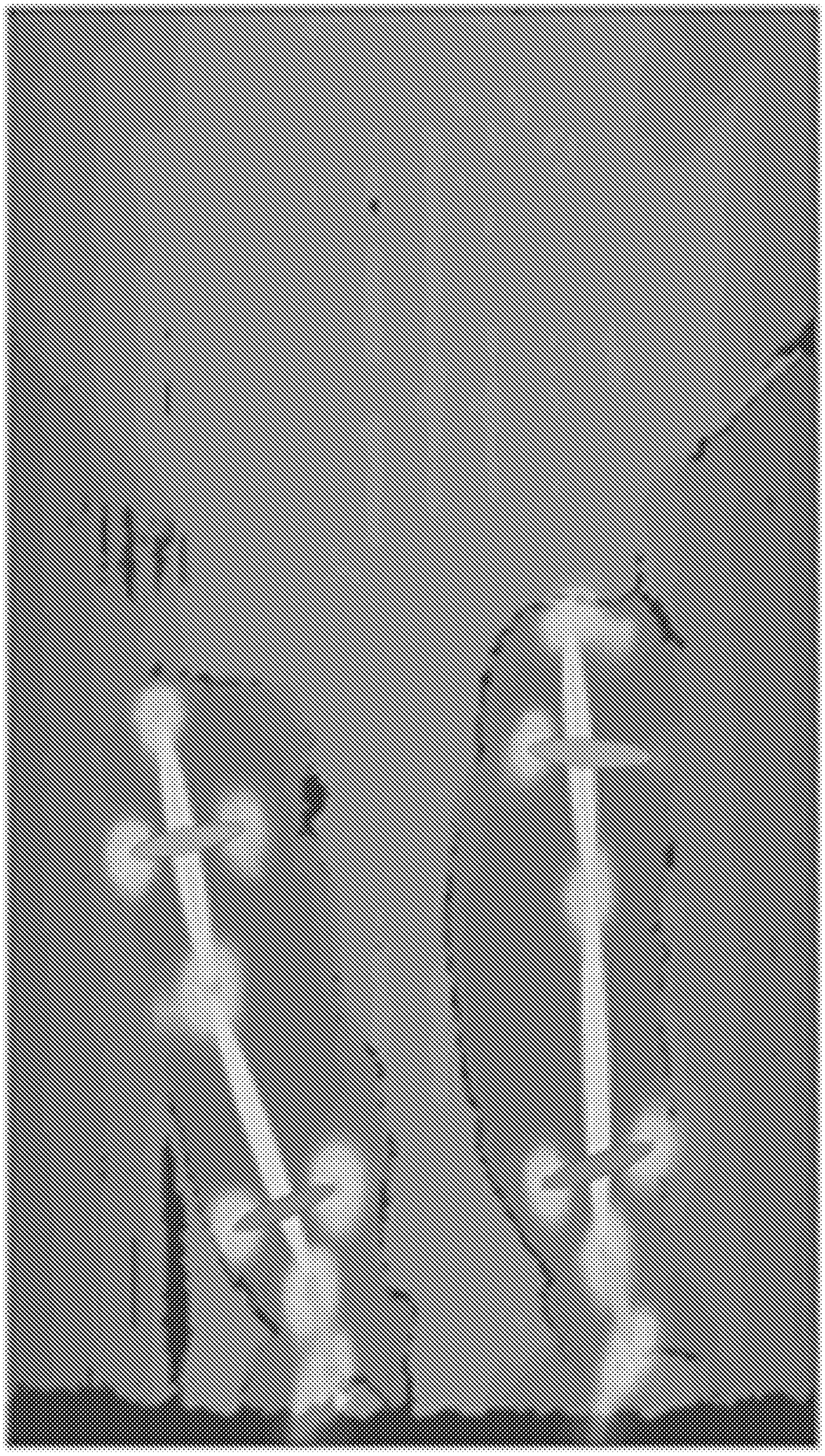
FIG. 11C is an exemplary third set of pose estimates of a pig and an exemplary fourth set of pose estimates of another pig overlaid on a third depth image frame.
Figure 11D:
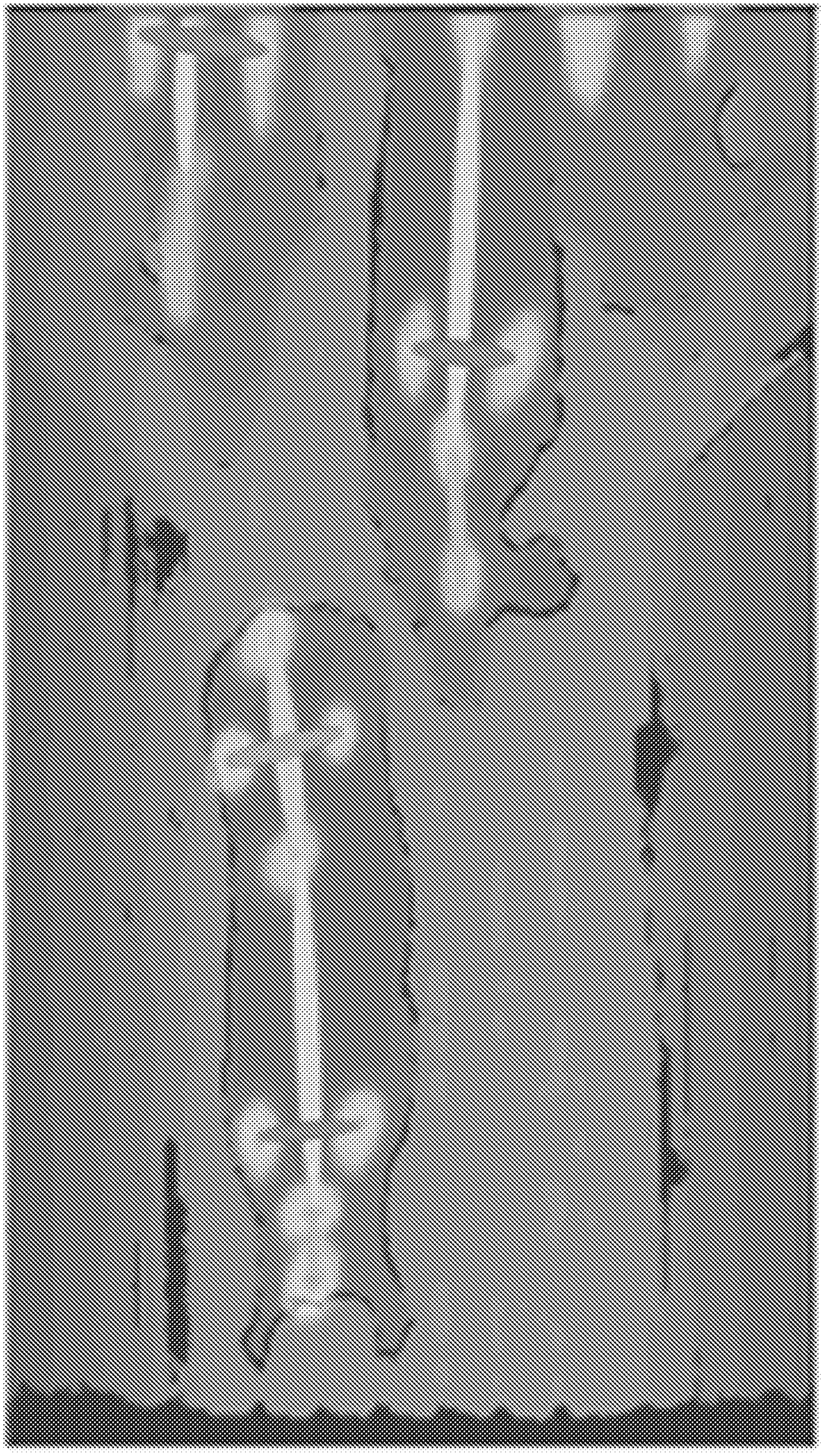
FIG. 11D is an exemplary fifth set of pose estimates of a pig and portions of other sets of pose estimates of other pigs overlaid on a fourth depth image frame.

These estimated joint locations can be evaluated by comparing with the human-specified mark centers in the IR images and generated labels. Histograms of these errors are shown in FIGS. 9 and 10. These show an average difference of 12 pixels (or 2.0 cm) from the detector-estimated landmark centers, and an average error of 16 pixels (or 2.7 cm) compared to human labeled landmark centers.

From this Livestock Example, it can be seen that the Transpositional Tagging method allows for an efficient, accurate, and automated method for labeling a pose or posture of interest in depth images. Having a labeled/identified depth image set allows for a variety of new applications with substantially less upfront resource needs (e.g., much less human intervention, less human error, and more refined and subtle detections of changes in pose/posture). For example, the tagged depth images can enable training of a neural network (e.g., CNN or LSTM) to infer animal pose and animal movement from a single depth image or series of images.

Applications of this technique could be useful in monitoring the pose, posture, gait, and movements of livestock such as pigs (including both sows and hogs), dairy cattle, beef cattle/brahma breeds, sheep, goats, buffalo and other similar mammals, as well as turkeys, emu, and other birds. Additionally, the monitoring and tagging techniques described above could be utilized in remote monitoring of wildlife. For example, datasets could be created for the movement of endangered species or monitored herds from monitoring devices located in national parks or preservation areas. Their movements and posture detected from automatically tagged datasets could be utilized to train a neural network to predict health assessments, injuries, and the like.

Example 2: Human Movement

In another embodiment, various human activities could be detected and auto-tagged training datasets generated to allow for diagnosis or prediction of certain outcomes. One substantial benefit of auto-generation of tagged depth images of human activity is the ability to preserve privacy of the subject of the image/video clip. For example, in an IR, UV, or optical image it may be possible to detect the identity of an individual, which can cause privacy concerns for that individual and potentially restrict the usage of the image. However, because a depth image lacks texture, color, and other attributes of other types of images, it is generally much more difficult to assess human identity from a depth image. Additionally, annotating an optical image using interleaved UV illumination can provide the same privacy benefits as using a depth image.

For example, in one embodiment, a monitoring device could be situated in relation to a physical therapy location to monitor individuals performing a physical therapy activity (e.g., such as walking on a treadmill, walking up/down stairs, or standing from a seated or squat position, or raising/lowering arms). The monitoring device may comprise a depth camera that is also capable of acquiring an additional image modality, or a depth camera in addition to a separate camera. The individuals could be asked to wear markers on their body or clothing that would appear in IR, UV, or optical images, and designate certain landmark structures, like ankles, knees, hips, lower back, shoulders, elbows, neck, etc. By obtaining IR, UV, or optical images simultaneously with depth images and/or optical images with interleaved UV illumination, a more robust dataset can be generated from which movement of a joint or series of joints can be assessed. The dataset would include both depth information (Which would be lacking from an optical image alone) as well as benefit from reduced resources to generate the labeled dataset. These datasets might be correlated to basic characteristics like gender, age, etc., but the tagged depth images or clips in the datasets would not review the individual's identities. A neural network could then be trained to associate certain types of motion with positive or negative outcomes of courses of treatment.

One benefit of utilizing auto-tagged and generated datasets is the ability to have more training data from more specific categories of individuals. Presently, the upfront resource demands of generating tagged and labeled datasets of human activities can make it difficult or infeasible to have specific training datasets for specific human activities. However, an automated system based on a Transpositional Tagging technique could allow for the efficient and cost-effective generation of a dataset as specific as, for example, datasets involving individuals over the age of 75 who are recovering from hip injuries caused by lateral falls. Their balance and motion could be monitored during physical therapy, and then associated with outcomes identified by the physical therapist.

In another embodiment, a monitoring device could be utilized to monitor athletic movements, for purposes of generating a training dataset to identify good/poor mechanics or load, as well as things like injury risk. In such an embodiment, for example, a 3D video clip tracking motion of a baseball hitter's swing (e.g, both the movement of the bat as well as movement of the hitter's feet, knees, legs, hips, hands, wrists, arms, elbows, and/or shoulders). In such an embodiment, markers would be placed on the bat as well as the hitter, such as wax crayon or UV-reflective markings.

Example 3: Alternating, Near-Simultaneous Dual Image Acquisition

In yet another embodiment, a system may be provided in which one more image acquisition modalities are utilized in an alternating mode arrangement, in a near real-time manner. In such an embodiment, a deep neural network could be trained to estimate the posture of articulated objects from, e.g., only color images or color and UV images. This system could be utilized to obtain automatically-labeled video or still/frame images of a subject of interest, such as a human or animal, but using only a regular optical video camera.

First a subject of interest would be marked with markers that are sensitive to a particular wavelength or type of light, such as infrared or UV. In some known attempts, subjects of interest are asked to wear motion-tracking suits, but this creates a problem that the markers change the appearance of the target, and so a neural network trained on a person with markers is unlikely to successfully track a target without markers. Additionally, motion tracking suits are undesirable for many video applications where it may be desirable to preserve the appearance of, e.g., a human performer. Likewise, because of the uniformity of motion capture suits, manual hand-labeling is the current approach for training posture estimation methods, but this is tedious and slow.

Therefore, it would be desirable to have a system in which easily recognizable markers are present on a person, to provide guidance for the a neural network tracking model, but at the same time to be invisible to the imaging modality to preserve the look of a video acquisition.

The inventors have determined that a solution to this problem would be to mark structural landmarks of interest on an individual or animal using markings that are not visible to the human eye in optical wavelength light. For example, a subject of interest could be marked at its joints using "invisible" ink or other UV-sensitive markings, such as an invisible fluorescent crayon (available from Tritech Forensics). In other embodiments, markings that are highly visible in IR imaging could be alternatively used.

Next, optical video acquisition of the subject of interest could take place at, e.g., 120 frames per second (fps), 60 fps; or 30 fps. During video acquisition, lighting of the subject of interest could be strobed using a UV illuminator at, e.g., 60 strobes per second; 30 strobes per second; 15 strobes per second; or 6 strobes per second. An led-based UV strobe illuminator such as available from Unilux could be utilized.

In one implementation, the illuminator is operated by a controller that syncs strobing of the illuminator with image capture. Thus, in the obtained video clip, every other image, or every third image, or every 4th image (or other desired periodicity) would be illuminated by UV light causing the markings to be highly visible.

For example, in a livestock imaging application, the illuminator would be placed adjacent to the camera, and the illuminator/camera device could be positioned in a location relative to the animals as discussed above with respect to the depth-based monitoring device. In another embodiment, two camera/illuminator devices could be positioned at offset angles to obtain passive 3D information regarding the animals. The data acquisitions from these devices would detect UV markings of the animals with the ink at their joints.

In another example, the illuminator could be integrated into set lighting at a studio or integrated into a camera, such that only regular optical video acquisition modality would need to be utilized, but both marked and native frames would be included in a video clip.

In this way a camera will observe markers on an object of interest in periodically alternating frames of a video acquisition. The frames containing observable markers can be used as labels for guiding an automated Transpositional Labeling technique, as described above. In other words, while the other images will have no illumination, but we will know the joint locations by interpolating between adjacent labeled images.

Similar to the alternative embodiments discussed above, one neural network can be trained to detect marks in the modality or images in which they are visible, and these detected annotations are transposed to the second modality in order to train the second neural networks to automatically predict their location.

Network 1: landmark detector. The landmark detector may include a neural network that is trained to detect illuminated marks. The "cue" detected by the landmark detector will be brightness differences in the image set to which the detector is applied. For example, the landmark detector may detect a brightness difference at points of interest of a subject being filmed between the current frame and adjacent frames. For example a set or pattern of marks can be detected, their centers located, and the marks labeled (either manually in one or a group of frames, followed by automated extrapolation of the markings to other frames; or automated for all frames). The landmark detector may be trained to detect the highlighted points or marks in the illuminated images, although the non-illuminate image dataset will be utilized by the next neural network.

Network 2: Posture estimator network. Locations corresponding to landmarks of interest will be interpolated from illuminated images into non-illuminated images as ground truth labels. For example, this could be done according to a Transpositional Tagging method, as described above. The labeled, non-UV illuminated images will be used to train a movement or posture estimator network. In one embodiment, the network can input both UV-illuminated and non-UV-illuminated images to track movement. In another embodiment, a neural network, once trained as described above, could input and operate on color-only (non-UV-illuminated) images.

Figure 12:
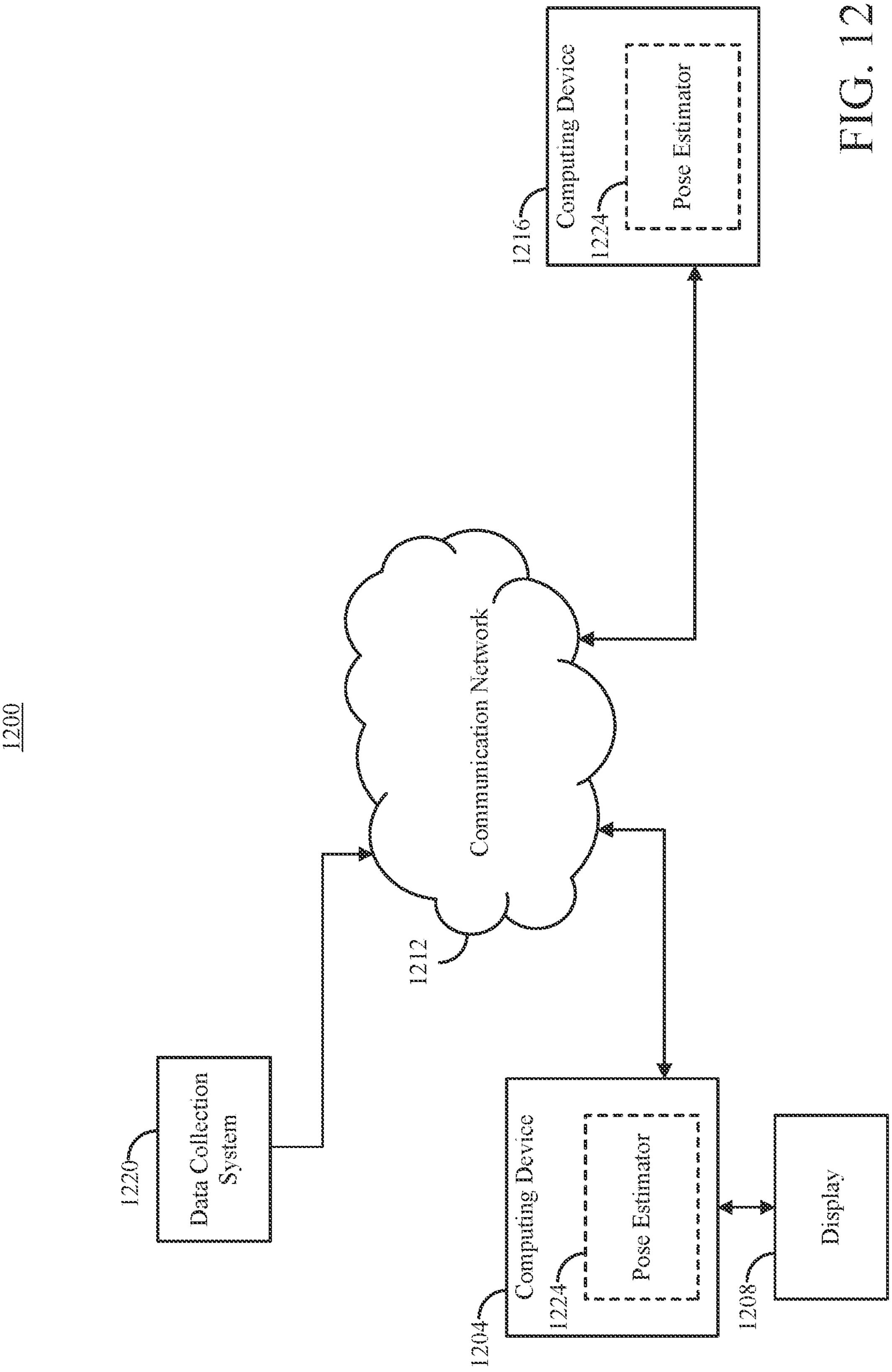
FIG. 12 is an exemplary posture estimation system 1200.

FIG. 12 is an exemplary posture estimation system 1200. The posture estimation system can include a computing device 1204, a display 1208, a data collection system 1220, and/or a supplementary computing device 1216 in communication over a communication network 1212. The communication network can include a wired network such as an Ethernet network and/or a wireless network such as a WiFi network and/or a cellular network. The computing device 1204 and/or the supplementary computing device 1216 can include a processor and a memory. In some embodiments, the computing device 1204 and/or the supplementary computing device 1216 can be a server computer, a laptop computer, a tablet computer, a desktop computer, a smartphone, and/or another suitable computing device. In some embodiments, the data collection system 1220 can be the system 300 in FIG. 3.

The computing device 1204 and/or the supplementary computing device 1216 can implement a pose estimator application 1224. In some embodiments, the a pose estimator application 1224 can implement at least a portion of the process 100 in FIG. 1. In some embodiments, the neural network 400 in FIG. 4 and/or the model 600 in FIG. 6 can be stored on one or more memories in the computing device 1204 and/or the supplementary computing device 1216. The computing device 1204 and/or the supplementary computing device 1216 may receive image data from the data collection system 1220 in order to execute at least a portion of the process 100.

The present invention has been described in terms of one or more preferred embodiments, and it should be appreciated that many equivalents, alternatives, variations, and modifications, aside from those expressly stated, are possible and within the scope of the invention.

Example 1. A system comprising: at least one camera; at least one processor; at least one memory in communication with the at least one camera and the at least one processor, having a set of instructions stored thereon which, when executed by the processor, cause the system configured to: obtain a first set of image data corresponding to an object of interest at a given timeframe; determine location identifiers at one more locations in at least one image of the first set of image data corresponding to one or more landmarks of interest; automatically apply the location identifiers to locations of the one or more landmarks of interest in additional images of the first set of image data; transpose the location identifiers applied to the images of the first set of image data to images of a second set of image data corresponding to the same object of interest during the same given timeframe; and store the second set of image data with transposed identifiers in the at least one memory.

Example 2. The system of Example 1, wherein the at least one camera is configured to acquire more than one type of image, and wherein the first set of image data and the second set of image data are different image types.

Example 3. The system of Example 2, wherein the at least one camera comprises a 3D depth camera configured to acquire depth images and IR images.

Example 4. The system of Example 1, wherein the set of instructions which cause the processor to determine location identifiers at one or more locations in the at least one image further cause the processor to: automatically detect locations corresponding to the one or more landmarks of interest by identifying highlighted points visible on the object of interest in the at least one image; ignore highlighted points that do not correspond to at least one of an expected pattern, expected number, expected shape, or expected size of highlighted points corresponding to the one or more landmarks of interest; and detect the center of the remaining highlighted points.

Example 5. The system of Example 1, wherein the location identifiers further comprise annotations corresponding to the one or more landmarks of interest, and wherein the set of instructions which cause the processor to determine location identifiers at one or more locations in the at least one image further cause the processor to: receive the annotations, which correspond to the one or more landmarks of interest for the at least one image; and apply the annotations to corresponding highlighted points representing landmarks of interest in additional images of the first image data set.

Example 6. The system of Example 1, wherein the at least one camera acquires the first image data set and the second image data set as simultaneous video acquisitions.

Example 7. The system of Example 1, wherein the at least one camera acquires the first image data set and the second image data set as interleaved frames of a video acquisition during the timeframe.

Example 8. The system of Example 1, further comprising an illuminator, and wherein the object of interest has been marked with markers sensitive to the output of the illuminator, such that at least one of the first image data set and the second image data set exhibit the markers as illuminated by the illuminator.

Example 9. The system of Example 8, wherein the camera is an optical camera and the illuminator is a strobing UV-illuminator; and wherein the markers on the object of interest comprise a UV-sensitive ink; and wherein the first image data set comprises frames of a video acquisition in which the UV-illuminator was on and the markers were visible to the optical camera, while the second image data set comprises frames of a video acquisition in which the UV-illuminator was off and the markers were not visible to the optical camera; and wherein the location identifiers correspond to the illuminated markers.

Example 10. A method for assessing movement of a subject comprising: acquiring video data of the subject during a given timeframe; tagging landmarks of interest of the subject in frames of the video data, using at least one landmark detector, wherein the landmark detector comprises a first neural network trained by generating a first annotated training dataset of a first imaging modality and transposing tags of the first training dataset to a second training dataset of a second imaging modality; providing the frames of the video data to a second neural network, wherein the second neural network was trained by associating condition determinations of a set of objects of interest with tagged video clips of movement of the objects of interest; and determining a condition of the movement of the subject using the second neural network.

Example 11. The method of Example 10, wherein the video data is optical video data, and the landmark detector identifies the landmarks of interest from the optical video data, and the second neural network determines a condition of movement of the subject from tagged optical video data.

Example 12. The method of Example 10, wherein the video data comprises simultaneously-acquired IR data and depth data, and wherein the landmark detector tags landmarks in the IR data, wherein the method further comprises the step of: transposing tags from frames of the IR data acquired of the subject during the given timeframe to corresponding frames of the depth data acquired of the subject during the given timeframe.

What is claimed is:

1. A system comprising:

at least one camera; and at least one processor;

wherein the system is further characterized by at least one memory in communication with the at least one camera and the at least one processor, having a set of instructions stored thereon which, when executed by the processor, cause the system configured to:

obtain a first set of image data corresponding to an object of interest at a given timeframe;

determine location identifiers at one or more locations in at least one image of the first set of image data corresponding to one or more landmarks of interest;

automatically apply the location identifiers to locations of the one or more landmarks of interest in additional images of the first set of image data;

transpose the location identifiers applied to the images of the first set of image data to images of a second set of image data of a different image modality than the first set of image data, corresponding to the same object of interest during the same given timeframe, wherein the transposing comprises computationally mapping pixel coordinates of the location identifiers from the first set of image data to corresponding pixel coordinates in the second set of image data; and store the second set of image data with transposed identifiers in the at least one memory.

2. The system of claim 1, wherein the at least one camera is configured to acquire more than one type of image, and wherein the first set of image data and the second set of image data are different image types.

3. The system of claim 2, wherein the at least one camera comprises a 3D depth camera configured to acquire depth images and IR images.

4. The system of claim 1, wherein the set of instructions which cause the processor to determine location identifiers at one or more locations in the at least one image further cause the processor to:

automatically detect locations corresponding to the one or more landmarks of interest by identifying highlighted points visible on the object of interest in the at least one image;

ignore highlighted points that do not correspond to at least one of an expected pattern, expected number, expected shape, or expected size of highlighted points corresponding to the one or more landmarks of interest; and detect the center of the remaining highlighted points.

5. The system of claim 1, wherein the location identifiers further comprise annotations corresponding to the one or more landmarks of interest, and wherein the set of instructions which cause the processor to determine location identifiers at one or more locations in the at least one image further cause the processor to:

receive the annotations, which correspond to the one or more landmarks of interest for the at least one image; and apply the annotations to corresponding highlighted points representing landmarks of interest in additional images of the first image data set.

6. The system of claim 1, wherein the at least one camera acquires the first image data set and the second image data set as simultaneous video acquisitions.

7. The system of claim 1, wherein the at least one camera acquires the first image data set and the second image data set as interleaved frames of a video acquisition during the timeframe.

8. The system of claim 1, further comprising an illuminator, and wherein the object of interest has been marked with markers sensitive to an output of the illuminator, such that at least one of the first image data set and the second image data set exhibit the markers as illuminated by the illuminator.

9. The system of claim 8, wherein the camera is an optical camera and the illuminator is a strobing UV-illuminator; and wherein the markers on the object of interest comprise a UV-sensitive ink; and wherein the first image data set comprises frames of a video acquisition in which the UV-illuminator was on and the markers were visible to the optical camera, while the second image data set comprises frames of a video acquisition in which the UV-illuminator was off and the markers were not visible to the optical camera; and wherein the location identifiers correspond to the illuminated markers.

10. A method comprising:

obtaining a first set of image data from at least one camera, the first set of image data corresponding to an object of interest at a given timeframe;

determining location identifiers at one or more locations in at least one image of the first set of image data corresponding to one or more landmarks of interest;

automatically applying the location identifiers to locations of the one or more landmarks of interest in additional images of the first set of image data;

transposing the location identifiers applied to the images of the first set of image data to images of a second set of image data of a different image modality than the first set of image data, corresponding to the same object of interest during the same given time frame, wherein the transposing comprises computationally mapping pixel coordinates of the location identifiers from the first set of image data to corresponding pixel coordinates in the second set of image data, the second set of image data being received from the at least one camera; and storing the second set of image data with transposed identifiers in at least one memory.

11. The method of claim 10, wherein the first set of image data and the second image data are of different image types.

12. The method of claim 10, wherein the different image types include at least one of depth images or IR images.

13. The method of claim 10, wherein determining the location identifiers includes:

automatically detecting locations corresponding to the one or more landmarks of interest by identifying highlighted points visible on the object of interest in the at least one image;

ignoring highlighted points that do not correspond to at least one of an expected pattern, expected number, expected shape, or expected size of highlighted points corresponding to the one or more landmarks of interest; and detecting the center of the remaining highlighted points.

14. The method of claim 10, wherein the location identifiers further comprise annotations corresponding to the one or more landmarks of interest; and determining the location identifiers includes:

receiving the annotations, which correspond to the one or more landmarks of interest for the at least one image, and applying the annotations to corresponding highlighted points representing landmarks of interest in additional images of the first image data set.

15. The method of claim 10, wherein the first image data set and the second image data set correspond to simultaneous video acquisitions by the at least one camera.

16. The method of claim 10, wherein the first image data set and the second image data set correspond to interleaved frames of a video acquisition during the timeframe.

17. The method of claim 10, wherein the object of interest has been marked with markers sensitive to an output of an illuminator, such that at least one of the first image data set and the second image data set exhibit the markers as illuminated by the illuminator.

18. The method of claim 17, wherein the at least one camera includes an optical camera;

the illuminator is a strobing UV-illuminator;

the markers on the object of interest comprise a UV-sensitive ink; and the first image data set comprises frames of a video acquisition in which the UV-illuminator was on and the markers were visible to the optical camera, while the second image data set comprises frames of a video acquisition in which the UV-illuminator was off and the markers were not visible to the optical camera; and wherein the location identifiers correspond to the illuminated markers.

* * * * *